(12) United States Patent
Murase

(10) Patent No.: US 9,692,237 B2
(45) Date of Patent: Jun. 27, 2017

(54) ELECTRONIC MEDIUM WITH IC AND SYSTEM OF THE SAME

(75) Inventor: Motonori Murase, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 1309 days.

(21) Appl. No.: 13/535,389

(22) Filed: Jun. 28, 2012

(65) Prior Publication Data

US 2014/0001851 A1    Jan. 2, 2014

(51) Int. Cl.
   *H02J 1/00*     (2006.01)
   *H02J 5/00*     (2016.01)
   *H04B 5/00*     (2006.01)

(52) U.S. Cl.
   CPC ............ *H02J 5/005* (2013.01); *H04B 5/0037* (2013.01); *H04B 5/0056* (2013.01); *Y10T 307/445* (2015.04)

(58) Field of Classification Search
   CPC ..... H02J 5/005; H04B 5/0037; H04B 5/0056; Y10T 307/445
   USPC ........................................................ 307/104
   See application file for complete search history.

(56) References Cited

U.S. PATENT DOCUMENTS

| | | | | |
|---|---|---|---|---|
| 5,278,454 A * | 1/1994 | Strauss | ................... | H02J 9/061 307/64 |
| 9,008,275 B2 * | 4/2015 | Hanlon | ................... | A61B 6/56 378/101 |
| 2005/0213273 A1 * | 9/2005 | Wang | ................... | H02J 1/102 361/90 |
| 2008/0080214 A1 * | 4/2008 | Umeda | ................... | H02J 17/00 363/37 |
| 2008/0224544 A1 * | 9/2008 | Koyama | ................... | G06F 3/046 307/104 |
| 2009/0067207 A1 * | 3/2009 | Nishino | ................... | B60L 5/005 363/126 |
| 2009/0122584 A1 * | 5/2009 | Akerlund | ............ | H02M 3/3353 363/126 |
| 2009/0189458 A1 * | 7/2009 | Kawasaki | ............. | B60L 11/182 307/104 |
| 2010/0097830 A1 * | 4/2010 | Wang | ................ | H02M 3/33576 363/126 |
| 2010/0237692 A1 * | 9/2010 | Mlaker | .................... | B66C 23/78 307/9.1 |

(Continued)

FOREIGN PATENT DOCUMENTS

| | | |
|---|---|---|
| JP | 2003-333857 A | 11/2003 |
| JP | 2008-217103 A | 9/2008 |
| JP | 2011-134049 A | 7/2011 |

OTHER PUBLICATIONS

Official Communication issued in corresponding Japanese Patent Application No. 2009-292026, mailed on Jun. 25, 2013.

*Primary Examiner* — Jared Fureman
*Assistant Examiner* — Emmanuel R Dominique
(74) *Attorney, Agent, or Firm* — Keating & Bennett, LLP

(57) ABSTRACT

An electronic medium with an integrated circuit includes a power feeding terminal pair including a first power feeding terminal and a second power feeding terminal, an integrated circuit including at least one first rectifying circuit, and a second rectifying circuit that is separate from the integrated circuit, wherein the first rectifying circuit and the second rectifying circuit are connected in series between the first power feeding terminal and the second power feeding terminal.

15 Claims, 19 Drawing Sheets

(56) References Cited

U.S. PATENT DOCUMENTS

| | | | | |
|---|---|---|---|---|
| 2011/0285511 A1* | 11/2011 | Maguire | ............ | G06K 19/0724 340/10.1 |
| 2012/0235508 A1* | 9/2012 | Ichikawa | ................ | H02J 5/005 307/104 |
| 2014/0001876 A1* | 1/2014 | Fujiwara | ................ | H02J 17/00 307/104 |

* cited by examiner

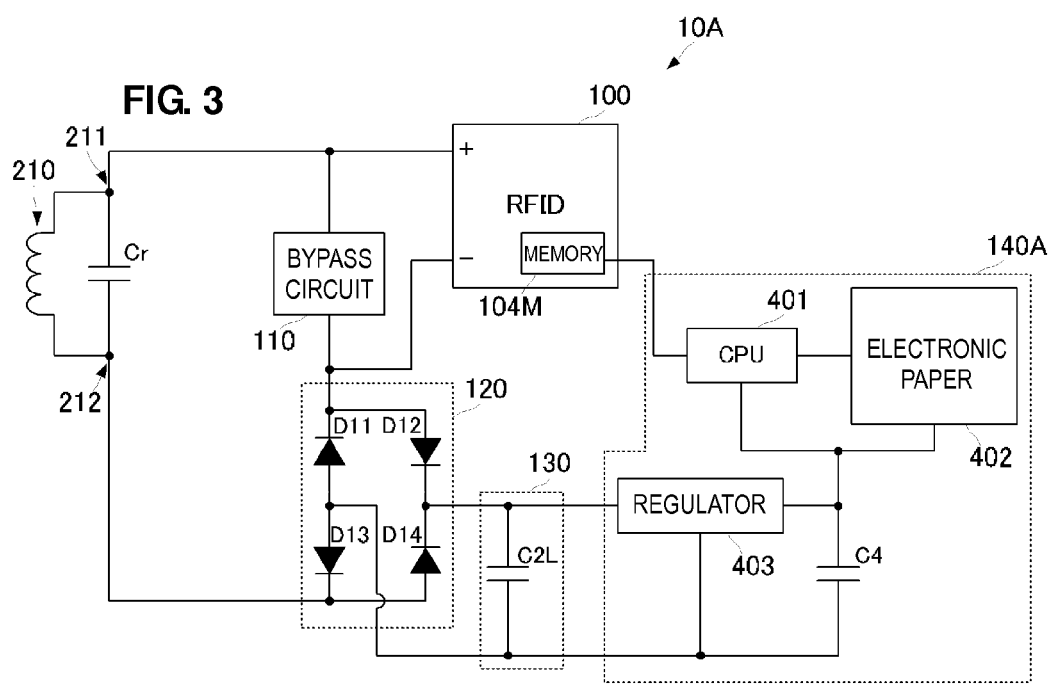

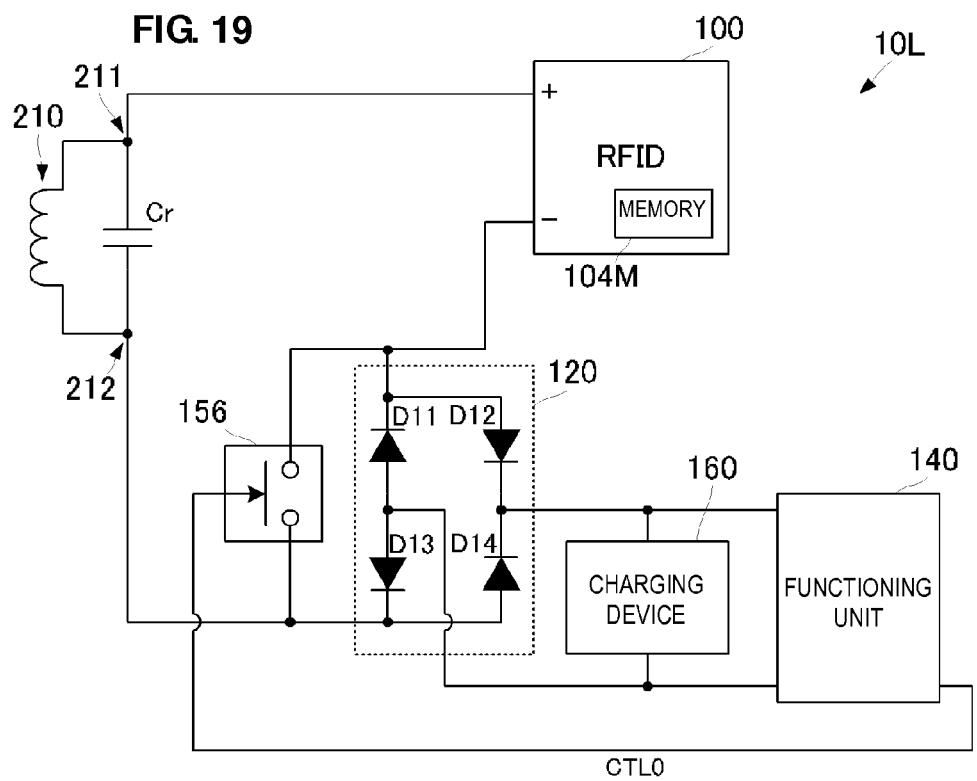

ELECTRONIC MEDIUM WITH IC AND SYSTEM OF THE SAME

BACKGROUND OF THE INVENTION

1. Field of the Invention

The present invention relates to an electronic medium with an integrated circuit (IC), such as an RFID tag, which receives a supply of power from an external device, and also relates to a system of operating an electronic medium with IC.

2. Description of the Related Art

An RFID tag that receives a supply of power from a reader/writer device in a non-contact manner and communicates with the reader/writer device using the power has been used widely. Further, an electronic medium having additional values utilizing characteristics of the RFID tag, such as electronic paper as disclosed in Japanese Unexamined Patent Application Publication No. 2009-136556, has also been used widely.

Such an electronic medium has a configuration including an antenna coil and an IC chip that are included in an RFID tag, and a functional unit (electronic paper) as an additional portion, as disclosed in Japanese Unexamined Patent Application Publication No. 2009-136556. The IC chip includes a power feeding system circuit such as a rectifying circuit and a control unit. Further, the existing functional unit receives a control signal from the control unit of the IC chip so as to operate and receive a supply of power from the control unit.

However, as disclosed in the above-described Japanese Unexamined Patent Application Publication No. 2009-136556, when power is supplied from the control unit of the IC chip to the functional unit, power that can be supplied to the functional unit is restricted by a withstand voltage of the control unit.

FIG. 1 is a graph illustrating an example of a relationship between transmitted power that is output from a reader/writer device and power that is actually supplied to a control unit of an IC chip of an RFID tag.

In general, in the RFID tag, a protecting circuit is connected between a rectifying circuit and a smoothing circuit, and a control unit. The rectifying circuit and the smoothing circuit are circuits for obtaining a DC signal for a power source from an AC signal generated on an antenna coil. Further, a voltage to be applied to the control unit is restricted by the protecting circuit so as to prevent the control unit from being broken. Therefore, power to be supplied to the control unit is restricted and supply of power to the control unit is increased only up to power that follows a specification of the protecting circuit even if transmitted power from the reader/writer device is increased, as illustrated in FIG. 1.

Accordingly, the functional unit that receives power from the control unit receives a supply of power of equal to or lower than the restricted power only. Therefore, when a functional unit that cannot be operated with power supplied from the control unit or a functional unit that cannot be continuously operated therewith is added to an electronic medium including an RFID, a power supply source dedicated to the functional unit needs to be added. However, if such a dedicated power supply source is added, problems occur in that a size and shape of the electronic medium is increased more than acceptable, the number of component parts and manufacturing complexity are increased, the cost is increased, and so on.

SUMMARY OF THE INVENTION

Accordingly, preferred embodiments of the present invention provide an electronic medium including an integrated circuit (IC) that is significantly reduced in size, has a simplified configuration, and reliably and stably supplies power to a functional unit even if an IC chip which receives power from the outside to operate, and the functional unit which is different from the IC chip are included.

An electronic medium including an IC according to a preferred embodiment of the present invention includes a power feeding terminal pair defined by a first power feeding terminal and a second power feeding terminal, an integrated circuit (IC chip) including at least a first rectifying circuit, and a second rectifying circuit that is separate from the integrated circuit. The first rectifying circuit and the second rectifying circuit are connected in series between the first power feeding terminal and the second power feeding terminal.

With this configuration, the second rectifying circuit is preferably included and connected to the first rectifying circuit of the integrated circuit in series. Therefore, power can be supplied from the second rectifying circuit to a circuit (for example, a functional unit, which will be described later) which is different from the integrated circuit.

Further, the electronic medium with IC according to a preferred embodiment of the present invention preferably includes a bypass circuit connected to the first rectifying circuit in parallel.

With this configuration, with the bypass circuit, current flows through the second rectifying circuit through a current path that is different from the first rectifying circuit. Therefore, a power supply amount to the first rectifying circuit and a power supply amount to the second rectifying circuit can be made different from each other unlike a case in which the first rectifying circuit and the second rectifying circuit are connected in series. As a result, the power supply amount to the second rectifying circuit can be made larger than the power supply amount to the first rectifying circuit, for example.

Further, the electronic medium with IC according to a preferred embodiment of the present invention preferably includes an antenna coil, both ends of which are connected to the power feeding terminal pair.

This configuration is a non-limiting example of a specific configuration of a power supply to the electronic medium with IC. When the antenna coil is included, power can be obtained from a device having a power feeding function such as a reader/writer device with electromagnetic coupling.

Further, the integrated circuit of the electronic medium with IC according to a preferred embodiment of the present invention is an RFID chip, for example.

This configuration is a non-limiting example of a specific configuration of the integrated circuit of an electronic medium with IC according to a preferred embodiment of the present invention. If the integrated circuit is the RFID chip, power can be received in addition to ID authentication and the like.

Further, the electronic medium with IC according to a preferred embodiment of the present invention preferably includes a current distribution ratio control unit arranged and programmed to control a current distribution ratio with respect to the first rectifying circuit and the second rectifying circuit.

With this configuration, a ratio of current flowing through the first rectifying circuit and the second rectifying circuit can be controlled. That is to say, the ratio is not limited to a current ratio determined routinely as in the above-described bypass circuit, but the current ratio can be changed depending on conditions.

Further, the current distribution ratio control unit of the electronic medium with IC according to a preferred embodiment of the present invention includes a first switch connected to the first rectifying circuit in parallel, and a second switch connected to the second rectifying circuit in parallel. In addition, the current distribution ratio control unit includes a switch control unit arranged and programmed to perform control such that one of the first switch and the second switch is opened and the other of the first switch and the second switch is short-circuited.

This configuration is a non-limiting example of a specific configuration of the current distribution ratio control unit. For example, if the first switch is opened and the second switch is short-circuited, current does not flow through the second rectifying circuit and power is supplied from the first rectifying circuit to the integrated circuit only. On the other hand, if the first switch is short-circuited and the second switch is opened, current flows through the second rectifying circuit and power is supplied from the second rectifying circuit to a circuit at a subsequent stage (functional unit or the like, which will be described later) only.

Further, in the electronic medium with IC according to a preferred embodiment of the present invention, the switch control unit is included in the integrated circuit. The switch control unit outputs a control voltage signal at Low level or High level. The first switch is opened with the control voltage signal at Low level and is short-circuited with the control voltage signal at High level. The second switch is short-circuited with the control voltage signal at Low level and is opened with the control voltage signal at High level.

This configuration is a non-limiting example of a specific configuration of a switch control including the above-described first switch and the second switch.

Further, the first switch of the current distribution ratio control unit of the electronic medium with IC according to a preferred embodiment of the present invention is connected to the bypass circuit in series.

This configuration is a non-limiting example of a specific configuration in which the above-described first switch is connected to the bypass circuit in series. When the bypass circuit is included, the first switch is connected to the bypass circuit in series, thereby obtaining the above-described functions effectively.

Further, the electronic medium with IC according to a preferred embodiment of the present invention includes a charging device connected to an output terminal of the second rectifying circuit.

This configuration is a non-limiting example of a circuit connected to the output terminal of the second rectifying circuit. If the charging device is used, the charging device can be charged at the same time as operation of the integrated circuit. It is to be noted that in this case, if an electric double layer capacitor is used as the charging device, for example, the electronic medium with IC including the charging device can be relatively thin.

In addition, the electronic medium with IC according to a preferred embodiment of the present invention preferably includes a supply power control unit arranged and programmed to control an amount of power to be supplied to at least the second rectifying circuit.

With this configuration, when the above-described charging device is included, the need to supply power to the second rectifying circuit is eliminated at least temporarily after the charging device has been completely charged. In such a case, current flowing through the second rectifying circuit is stopped by the supply power control unit and power can be supplied only to the integrated circuit.

Further, the supply power control unit of the electronic medium with IC according to a preferred embodiment of the present invention preferably includes a third switch connected to the first rectifying circuit and the second rectifying circuit in series, and a charge control unit that is arranged and programmed to detect a charge state of the charging device to control closing and opening of the third switch.

This configuration is a non-limiting example of a specific configuration of the above-described supply power control unit. In a state in which the charging device has not been completely charged, the third switch is short-circuited and current flows through the entire circuit including the second rectifying circuit. If the charging device has been completely charged, the third switch is opened and current does not flow through the entire circuit. This makes it possible to control current flowing through the above-described second rectifying circuit.

Further, in the electronic medium with IC according to a preferred embodiment of the present invention, the supply power control unit outputs a supply control voltage signal at Low level or Hi level. The third switch is short-circuited with the supply control voltage signal at Low level and is opened with the supply control voltage signal at Hi level.

This configuration is a non-limiting specific configuration example of a switch control using the above-described third switch.

Further, the supply power control unit of the electronic medium with IC according to a preferred embodiment of the present invention preferably includes a fourth switch connected to the second rectifying circuit in parallel and a charge control unit arranged and programmed to detect a charge state of the charging device to control closing and opening of the fourth switch.

With this configuration, instead of current control for the entire circuit as described above, current control for the second rectifying circuit only can be performed. To be more specific, in a state in which the charging device has not been completely charged, the fourth switch is opened and current flows through the second rectifying circuit. If the charging device has been completely charged, the fourth switch is short-circuited and current does not flow through the second rectifying circuit.

Further, the integrated circuit of the electronic medium with IC according to a preferred embodiment of the present invention preferably includes a memory. In addition, the electronic medium with IC preferably includes a charge state detecting unit to detect a charge state of the charging device to write information of the charge state into the memory.

This configuration is a non-limiting example of a specific configuration in which the charge state is detected by the charge state detecting unit so as to be stored in the integrated circuit.

Further, the integrated circuit of the electronic medium with IC according to a preferred embodiment of the present invention preferably includes a memory and the charge control unit. Further, the electronic medium with IC preferably includes a charge state detecting unit to detect a charge state of the charging device to write information of the charge state into the memory. In addition, the charge control unit of the integrated circuit performs switch control based on the charge state stored in the memory.

This configuration is a non-limiting example of a specific configuration in which the above-described switch control based on the charge state is executed with the integrated circuit.

Further, in the electronic medium with IC according to a preferred embodiment of the present invention, a functional unit configured to electrically realize a predetermined function is connected to the output terminal of the second rectifying circuit.

This configuration specifically indicates that the functional unit is included at the output terminal of the above-described second rectifying circuit. Further, sufficiently necessary power can be supplied to the functional unit by using the above-described configurations and processing.

Further, the functional unit of the electronic medium with IC according to a preferred embodiment of the present invention preferably is a display device including a display panel to display information and a display control unit arranged and programmed to control display of the display panel.

This configuration is a non-limiting example of the above-described functional unit, in which the functional unit preferably is a display device such as a so-called electronic paper. It is to be noted that the functional unit can be also applied to devices having other functional circuits, such as a wireless communication device, a remote control device, a sensor device and so on, for example.

Further, a system of an electronic medium with IC according to a preferred embodiment of the present invention includes any one of the above-described IC-mounted electronic media, and an external power feeding device arranged to provide an AC signal through the power feeding terminal pair.

This configuration is a non-limiting example of a system of an electronic medium with IC including the above-described electronic medium with IC. If power supply from the external power feeding device is received, power supply at a ratio suitable for the first rectifying circuit and the second rectifying circuit of the electronic medium with IC is performed with the above-described configuration. With this, power supply to the integrated circuit, and power supply to the functional unit and the like connected to the second rectifying circuit are performed efficiently.

Further, the system of electronic medium with IC according to a preferred embodiment of the present invention preferably includes an antenna coil. In addition, the external power feeding device preferably is a reader/writer device including a different antenna coil which is capable of being electromagnetically coupled to the antenna coil of the system of electronic medium with IC, and a signal processing unit arranged to apply a signal having a predetermined frequency to the different antenna coil.

This configuration is a non-limiting example of a specific example of the above-described system of electronic medium with IC, in which the system of electronic medium with IC is applied to non-contact short-range communication with electromagnetic coupling. With this, power can be supplied to the circuit such as the functional unit connected to the second rectifying circuit efficiently while performing communication or after communication is performed between the integrated circuit including the first rectifying circuit and the reader/writer device.

According to various preferred embodiments of the present invention, power is reliably and stably supplied to a functional unit even though an integrated circuit (IC chip) which receives power from the outside to operate and the functional unit that is different from the IC chip are included in an electronic medium with IC.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a functional circuit diagram of an electronic module with RFID 10A when a functional unit 140 is an electronic paper device 140A according to the first preferred embodiment of the present invention.

FIG. 19 is a configuration circuit diagram of an electronic module with RFID 10L according to an eleventh preferred embodiment of the present invention.

DETAILED DESCRIPTION OF THE PREFERRED EMBODIMENTS

An electronic module system including an electronic module with RFID according to a first preferred embodiment of the present invention will be described with reference to the drawings. It is to be noted that an electronic module with RFID corresponds to the "electronic medium with IC" according to various preferred embodiments of the present invention and the electronic module system corresponds to the "system of electronic medium with IC" according to various preferred embodiments of the present invention.

Figure 1:
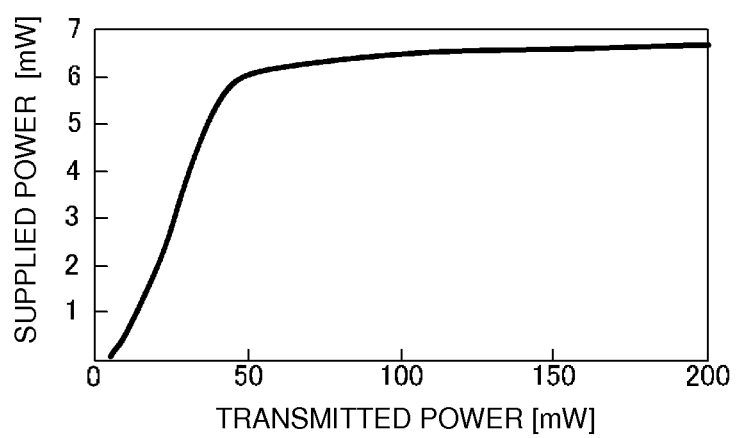
FIG. 1 is a graph of an example of a relationship between transmitted power that is output from a reader/writer device and power that is actually supplied to a control unit of an IC chip of an RFID tag.
Figure 2A:
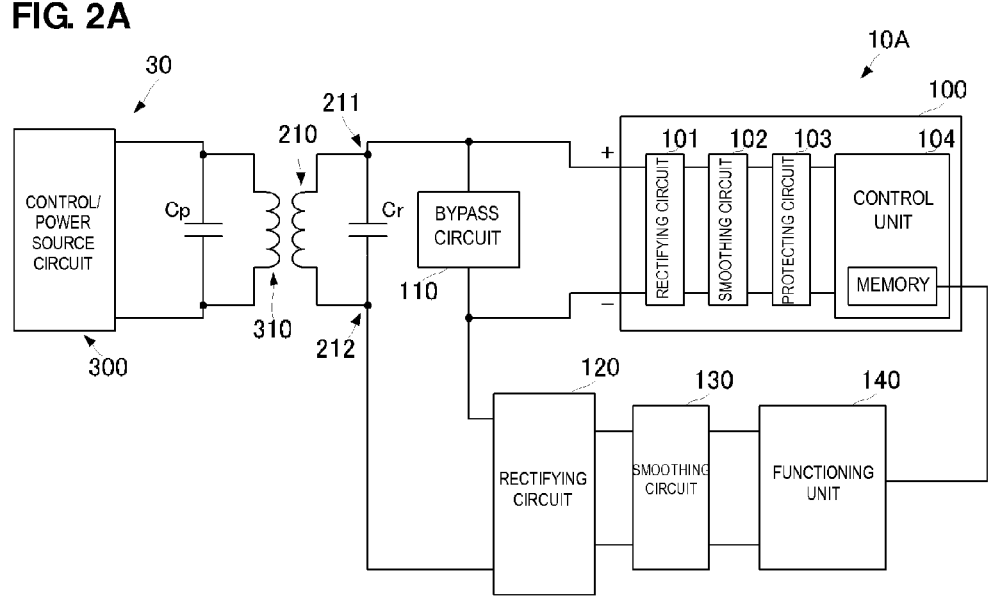
FIGS. 2A and 2B include a functional circuit diagram of a functional circuit configuration of an electronic module system including an electronic module with RFID according to a first preferred embodiment of the present invention, and an equivalent circuit diagram of the electronic module with RFID.
Figure 2B:
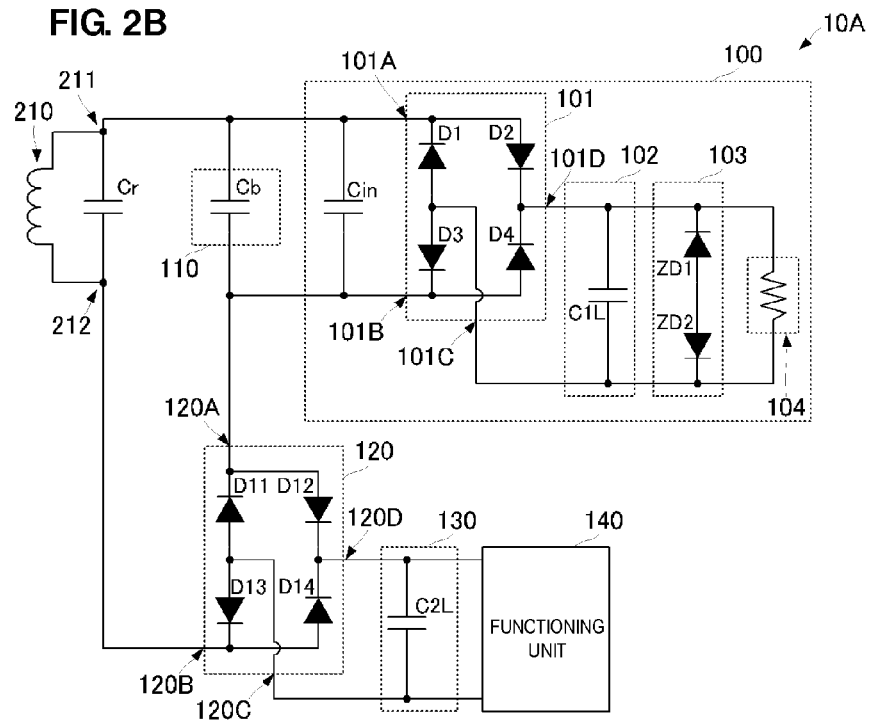

FIG. 2A is a functional circuit diagram of a functional circuit configuration of an electronic module system including an electronic module with RFID according to the present preferred embodiment of the present invention. FIG. 2B is an equivalent circuit diagram of the electronic module with RFID. It is to be noted that in FIG. 2B, a wiring line between an RFID 100 and a functional unit 140 is not illustrated because description relating to power is to be made mainly.

The electronic module system preferably includes an electronic module with RFID 10A and a reader/writer device 30.

At first, a configuration and processing of the reader/writer device 30 are described in order to facilitate understanding of the description of the electronic module with RFID 10A. The reader/writer device 30 includes a control/power supply circuit 300, a primary-side antenna coil 310, and a resonance capacitor Cp.

The control/power supply circuit 300 supplies power to the electronic module with RFID 10A and generates a driving signal to perform communication. The driving signal is an AC signal having a predetermined frequency. The control/power supply circuit 300 applies the driving signal to the primary-side antenna coil 310. The resonance capacitor Cp is connected to the primary-side antenna coil 310 in parallel. A capacitance of the resonance capacitor Cp is set so as to resonate at a predetermined resonance frequency based on a frequency of the driving signal. It is to be noted that the resonance frequency is preferably set to be lower than the frequency of the driving signal by some degree.

Further, the control/power supply circuit 300 performs communication of ID authentication or the like with a control unit 104 of the RFID 100 of the electronic module with RFID 10A, which will be described later, using amplitude modulation of the driving signal, for example. It is to be noted that as a communication method between the reader/writer device 30 and the control unit 104, it is sufficient that various known methods are used and description thereof is omitted here.

The electronic module with RFID 10A preferably has the following configuration while the reader/writer device 30 has the above configuration. At first, a functional configuration of the electronic module with RFID 10A is described with reference to FIG. 2A.

The electronic module with RFID 10A preferably includes a secondary-side antenna coil 210 that electromagnetically couples to the primary-side antenna coil 310. The electronic module with RFID 10A can obtain power in a wireless manner with the electromagnetic coupling between these antenna coils. However, if a configuration in which the secondary-side antenna coil 210 is not included is used, the electronic module with RFID 10A can obtain power in a wired manner. One terminal 211 of the secondary-side antenna coil 210 corresponds to the "first power feeding terminal" according to a preferred embodiment of the present invention and the other terminal 212 corresponds to the "second power feeding terminal" according to a preferred embodiment of the present invention. Further, both of these terminals of the secondary-side antenna coil 210 correspond to the "power feeding terminal pair" according to a preferred embodiment of the present invention.

A resonance capacitor Cr is connected to both terminals of the secondary-side antenna coil 210. That is to say, the secondary-side antenna coil 210 and the resonance capacitor Cr are connected to each other in parallel. A capacitance of the resonance capacitor Cr is set so as to have a predetermined resonance frequency based on a frequency of a driving signal in the same manner as the resonance capacitor Cp on the above-described reader/writer device 30 side.

The one terminal 211 of the secondary-side antenna coil 210 is connected to a first connecting terminal (terminal denoted with a symbol "+" in FIG. 2A) of the RFID 100.

The RFID 100 preferably includes an integrated circuit (IC chip) and a rectifying circuit 101 (corresponding to the "first rectifying circuit" according to a preferred embodiment of the present invention), a smoothing circuit 102, a protecting circuit 103, and the control unit 104.

The rectifying circuit 101 is an input stage of power supply for the RFID 100, and is connected to the above-described first connecting terminal and a second connecting terminal (terminal denoted with a symbol "−" in FIG. 2A). Output terminals of the rectifying circuit 101 are connected to the smoothing circuit 102, and output terminals of the smoothing circuit 102 are connected to the control unit 104 through the protecting circuit 103.

The control unit 104 is driven with power supplied through the rectifying circuit 101, the smoothing circuit 102, and the protecting circuit 103. In this case, the control unit 104 receives a supply of power of which supply voltage has been restricted by the protecting circuit 103. The control unit 104 preferably includes a memory (hereinafter, preferably a volatile memory unless otherwise specified). If the control unit 104 receives power supply so as to be driven, the control unit 104 reads out an authentication ID stored in the memory, performs amplitude modulation and the like based on the authentication ID, and performs communication with the control/power supply circuit 300 of the reader/writer device 30, for example.

A first terminal 120A of a rectifying circuit 120 (corresponding to the "second rectifying circuit" according to a preferred embodiment of the present invention) is connected to the second connecting terminal of the RFID 100. A second terminal 120B of the rectifying circuit 120 is connected to the other terminal 212 of the above-described secondary-side antenna coil 210.

The functional unit 140 having a predetermined function is connected to output terminals 120C, 120D of the rectifying circuit 120 through a smoothing circuit 130. The functional unit 140 is operated with power supplied through the rectifying circuit 120 and the smoothing circuit 130 so as to realize the predetermined function. For example, when the functional unit 140 is electronic paper as will be illustrated in FIG. 3, the functional unit 140 operates to perform display as electronic paper. It is to be noted that the functional unit 140 and the RFID 100 may be independent of each other or may be connected to each other with a predetermined signal line as illustrated in the drawing so that the functional unit 140 operates with reference to data in a memory 104M of the RFID 100.

Further, in the electronic module with RFID 10A in the present preferred embodiment, a bypass circuit 110 is connected between a pair of connecting terminals of the RFID 100.

That is to say, the electronic module with RFID 10A preferably has a configuration in which the rectifying circuit 101 of the RFID 100 and the rectifying circuit 120 at the outside of the RFID 100 are connected to both the terminals (211, 212) of the secondary-side antenna coil 210 in series, and the bypass circuit 110 is connected to the rectifying circuit 101 of the RFID 100 in parallel.

With this configuration, current can be made to flow through the rectifying circuit 101 and the rectifying circuit 120, and power can be supplied to the RFID 100. At the same time, power can be supplied to the functional unit 140 without passing through the control unit 104 of the RFID 100. This makes it possible to supply a desired amount of power to the functional unit 140 without being restricted by the protecting circuit 103 of the RFID 100 unlike the existing configuration.

In the above-described configuration, an example in which the bypass circuit 110 is included is described. However, power can be supplied to the above-described RFID 100 and functional unit 140 at the same time even if the bypass circuit 110 is not included. Note that if the bypass circuit 110 is provided, the ratio of current flowing through the rectifying circuit 101 of the RFID 100 and the rectifying circuit 120 can be adjusted. This makes it possible to supply larger power to the functional unit 140 through the rectifying circuit 120 than that to the RFID 100 by appropriately setting values of circuit elements configuring the bypass circuit 110.

Next, a specific circuit configuration example of the electronic module with RFID 10A is described with reference to FIG. 2B. It is to be noted that since the functional unit 140 preferably has a different circuit configuration depending on functions to be realized, the functional unit 140 is described as a circuit block simply here.

The resonance capacitor Cr is connected between the one terminal 211 and the other terminal 212 of the secondary-side antenna coil 210 in parallel with the secondary-side antenna coil 210.

The one terminal 211 of the secondary-side antenna coil 210 is connected to a first terminal 101A of the rectifying circuit 101. The rectifying circuit 101 preferably includes a bridge-type full-wave rectifying circuit which performs full-wave rectification of AC signals from the sides of the first terminal 101A and a second terminal 101B and outputs the rectified signals to the sides of a third terminal 101C and a fourth terminal 101D.

The second terminal 101B of the rectifying circuit 101 is connected to the first terminal 120A of the rectifying circuit 120. The rectifying circuit 120 preferably includes a bridge-type full-wave rectifying circuit which performs full-wave rectification of AC signals from the sides of the first terminal 120A and the second terminal 120B and outputs the rectified signals to the sides of the third terminal 120C and the fourth terminal 120D.

The second terminal 120B of the rectifying circuit 120 is connected to the other terminal 212 of the secondary-side antenna coil 210. With this, a circuit configuration in which the rectifying circuit 101 and the rectifying circuit 120 are connected in series between the one terminal 211 and the other terminal 212 of the secondary-side antenna coil 210 is realized. Further, an input capacitor Cin of the RFID 100 and a capacitor Cb are connected between the first terminal 101A and the second terminal 101B of the rectifying circuit 101 of the RFID 100 in parallel with the rectifying circuit 101. In the present preferred embodiment, the bypass circuit 110 preferably includes the capacitor Cb and the input capacitor Cin of the RFID 100. However, the bypass circuit can be configured by the capacitor Cb and other circuits even if the input capacitor Cin of the RFID 100 is not included.

Next, a circuit configuration in the RFID 100 is described more in detail.

The rectifying circuit 101 preferably has a configuration in which a series circuit of diodes D1, D3 and a series circuit of diodes D2, D4 are connected in parallel between the first terminal 101A and the second terminal 101B. In this case, a cathode of the diode D1 is connected to the first terminal 101A, an anode of the diode D1 is connected to an anode of the diode D3, and a cathode of the diode D3 is connected to the second terminal 101B. Further, a connecting point between the anode of the diode D1 and the anode of the diode D3 is connected to the third terminal 101C. In addition, an anode of the diode D2 is connected to the first terminal 101A, a cathode of the diode D2 is connected to a cathode of the diode D4, and an anode of the diode D4 is connected to the second terminal 101B. Further, a connecting point between the cathode of the diode D2 and the cathode of the diode D4 is connected to the fourth terminal 101D.

The smoothing circuit 102 preferably includes a smoothing capacitor C1L, which is connected in parallel between the third terminal 101C and the fourth terminal 101D of the rectifying circuit 101.

The protecting circuit 103 preferably includes a series circuit of zener diodes ZD1, ZD2, which is connected to the smoothing capacitor C1L in parallel. In this case, the series circuit is configured such that cathodes of the zener diodes ZD1, ZD2 are connected to the third terminal 101C and the fourth terminal 101D, respectively. Element values of the zener diodes ZD1, ZD2 are set based on a withstand voltage of the control unit 104.

The control unit 104 is expressed as a load on the equivalent circuit and is connected to the third terminal 101C and the fourth terminal 101D of the rectifying circuit 101 at the downstream side with respect to the smoothing circuit 102 and the protecting circuit 103.

With this configuration, the control unit 104 is operated with power which is obtained through the rectifying circuit 101 and the smoothing circuit 102 and of which voltage has been restricted by the protecting circuit 103 in the RFID 100. With this, the control unit 104 is operated normally by being protected from breakage due to overcurrent. It is to be noted that although description has been made based on a standard RFID circuit configuration hereinbefore, the above-described configuration can be applied to an equivalent circuit including a rectifying circuit on an integrated circuit.

Next, the rectifying circuit 120 and circuits on the functional unit 140 side of the rectifying circuit 120 are described more in detail.

The rectifying circuit 120 has a configuration in which a series circuit of diodes D11, D13 and a series circuit of diodes D12, D14 are connected in parallel between the first terminal 120A and the second terminal 120B. In this case, a cathode of the diode D11 is connected to the first terminal 101A, an anode of the diode D11 is connected to an anode of the diode D13, and a cathode of the diode D13 is connected to the second terminal 120B. Further, a connecting point between the anode of the diode D11 and the anode of the diode D13 is connected to the third terminal 120C. In addition, an anode of the diode D12 is connected to the first terminal 120A, a cathode of the diode D12 is connected to a cathode of the diode D14, and an anode of the diode D14 is connected to the second terminal 120B. Further, a connecting point between the cathode of the diode D12 and the cathode of the diode D14 is connected to the fourth terminal 120D.

The smoothing circuit 130 preferably includes a smoothing capacitor C2L which is connected in parallel between the third terminal 120C and the fourth terminal 120D of the rectifying circuit 120.

The functional unit 140 is connected to the third terminal 120C and the fourth terminal 120D of the rectifying circuit 120 at the downstream side with respect to the smoothing circuit 130.

With this configuration, power is supplied to the functional unit 140 through the rectifying circuit 120 and the smoothing circuit 130 independently of the RFID 100. Therefore, the functional unit 140 can obtain desired power without passing through the RFID 100 and can be operated independently of the RFID 100, as described above.

Further, as described above, with the configuration according to the present preferred embodiment, a power supply circuit for the functional unit 140, which is different from the RFID 100, is configured only by the rectifying circuit 120 as the full-wave rectifying circuit including the four diodes D11, D12, D13, D14, and the smoothing circuit 130 including the capacitor C2L. Therefore, the power supply circuit for the functional unit 140 can be configured to be simplified and reduced in size so that the electronic module with RFID 10A can be formed to be reduced in size.

Next, a case in which an electronic paper device is used as a specific example of the functional unit 140 is described with reference to FIG. 3. FIG. 3 is a functional circuit diagram of the electronic module with RFID 10A when the functional unit 140 is an electronic paper device 140A. It is to be noted that the RFID 100 is expressed by one functional block simply in FIG. 3, but has an internal configuration which is preferably the same as that in FIGS. 2A and 2B. Further, the terminals of the rectifying circuit 120 are not illustrated in FIG. 3, but are also preferably the same as those in FIGS. 2A and 2B. In addition, connecting configurations of the antenna coil 210, the resonance capacitor Cr, the RFID 100, the bypass circuit 110, the rectifying circuit 120, and the smoothing circuit 130 are those as illustrated in FIGS. 2A and 2B, and description thereof is omitted.

The electronic paper device 140A as the functional unit 140 preferably includes a CPU 401, an electronic paper 402, and a regulator 403. An input-side terminal and a common terminal of the regulator 403 are connected to the smoothing circuit 130, and an output terminal thereof is connected to the CPU 401 and the electronic paper 402. A smoothing capacitor C4 is connected between the output-side terminal and the common terminal of the regulator 403. With this configuration, a driving voltage at a desired voltage level is supplied to the CPU 401 and the electronic paper 402 of the electronic paper device 140A through the rectifying circuit 120, the smoothing circuit 130, and the regulator 403. It is to be noted that common terminals of components subsequent to the regulator 403, such as the CPU 401 and the electronic paper 402 and the like, are not illustrated.

The electronic paper 402 preferably includes a cholesteric liquid crystal, for example. The electronic paper 402 displays data in a memory 104M of the RFID 100, which has been read out from the CPU 401, under the control from the CPU 401 and maintains the display even after supply of power has finished.

The CPU 401 is connected to the memory 104M of the RFID 100. For example, the CPU 401 receives a control signal such as a display permission signal from the reader/writer device 30 through the memory 104M of the RFID 100 so as to control display of the electronic paper 402. Further, the CPU 401 acquires display information that has been supplied from the reader/writer device 30 through the RFID 100 and has been temporarily stored in the memory 104M of the RFID 100, and performs control to display the display information on the electronic paper 402. As for the control of the CPU 401, if the RFID 100 has a trigger output function, the RFID 100 may be connected to an interrupt port of the CPU 401 and a trigger signal may be used for activation.

Thus, if the configuration according to the present preferred embodiment is used, the electronic paper device 140A which requires driving power larger than an amount of power which the RFID 100 can receive can be driven without receiving power supply from the RFID 100. In this case, a power supply circuit for the electronic paper device 140A is configured only by the rectifying circuit 120 and the smoothing circuit 130 as described above. Therefore, the electronic module with RFID 10A including the electronic paper device can be formed to be reduced in size.

Figure 4:
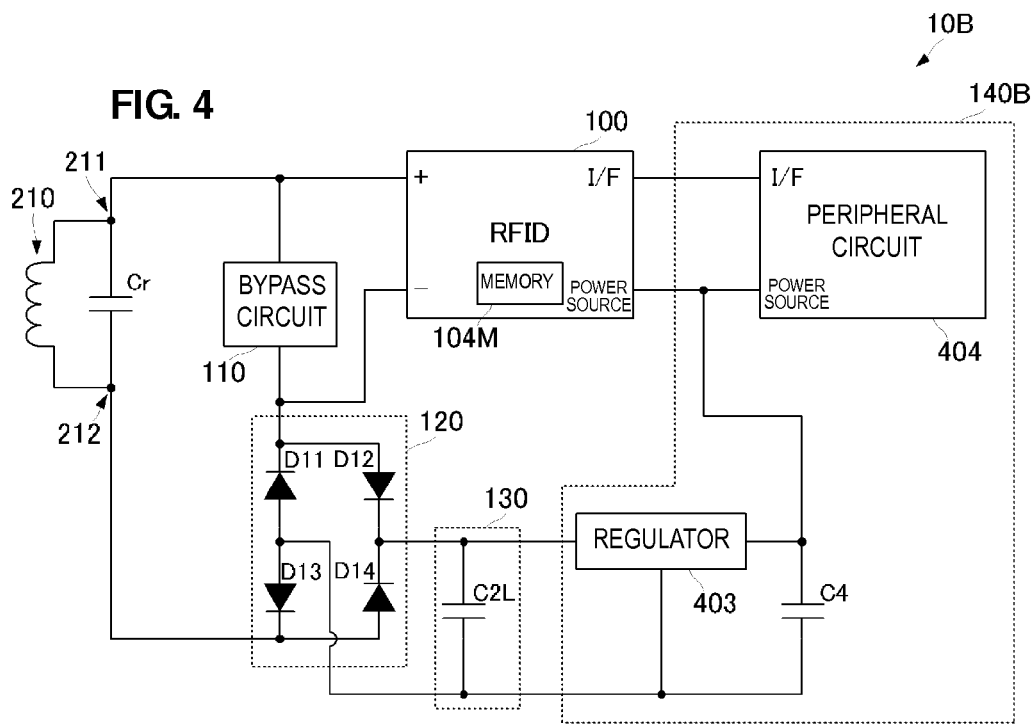
FIG. 4 is a functional circuit diagram of an electronic module with RFID 10B including a semi-passive RFID circuit according to the first preferred embodiment of the present invention.

Next, a case in which an RFID circuit is a semi-passive type, that is, requires an auxiliary power source is described with reference to FIG. 4 as another example of the above-described functional unit 140. FIG. 4 is a functional circuit diagram of an electronic module with RFID 10B including a semi-passive RFID circuit. In FIG. 4, a functional unit 140B preferably includes an auxiliary power source supply circuit that drives the semi-passive RFID circuit, and other peripheral circuits as needed. It is to be noted that also in FIG. 4, since a specific configuration of the RFID 100 and connecting configurations of the antenna coil 210, the resonance capacitor Cr, the RFID 100, the bypass circuit 110, the rectifying circuit 120, and the smoothing circuit 130 are preferably those as illustrated in FIGS. 2A and 2B, description thereof is omitted.

The RFID 100 in the present preferred embodiment further includes a power source terminal that is different from the above-described first connecting terminal and second connecting terminal.

The functional module 140B for semi-passive communication as the functional unit 140 includes the regulator 403 and a peripheral circuit 404. The regulator 403 preferably is a three-terminal regulator, and an input-side terminal and a common terminal of the regulator 403 are connected to the smoothing circuit 130 and an output terminal thereof is connected to a peripheral circuit 404 and the RFID 100. A capacitor C4 is connected between the output-side terminal and the common terminal of the regulator 403. With this configuration, a driving voltage at a desired voltage level is supplied to the peripheral circuit 404 of the functional module 140B for semi-passive communication through the rectifying circuit 120, the smoothing circuit 130, and the regulator 403. In addition, power can be also supplied to the RFID 100.

Even when the peripheral circuit 404 is included, power can be supplied to the peripheral circuit 404 stably so as to operate the peripheral circuit 404 stably. Further, even if power that is equal to or larger than power to be supplied from the rectifying circuit 101 is required by the peripheral circuit 404, power is supplied to the RFID 100 from the rectifying circuit 120 so that the RFID 100 can be operated stably.

Figure 5:
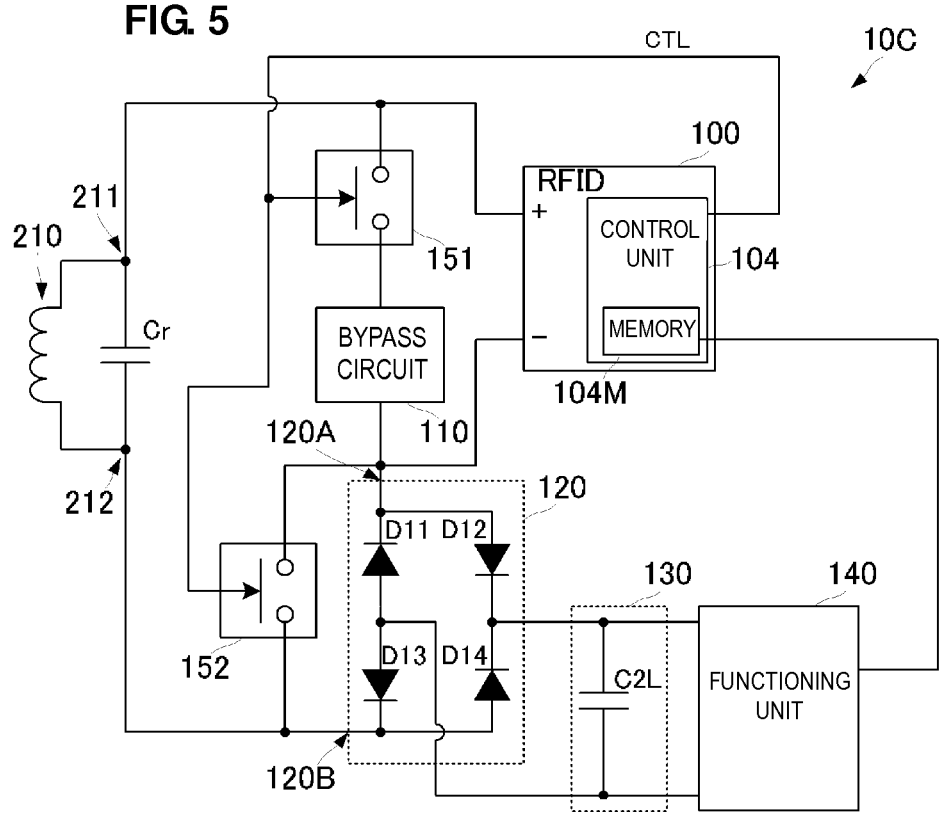
FIG. 5 is a functional circuit diagram of an electronic module with RFID 10C according to a second preferred embodiment of the present invention.
Figure 6:
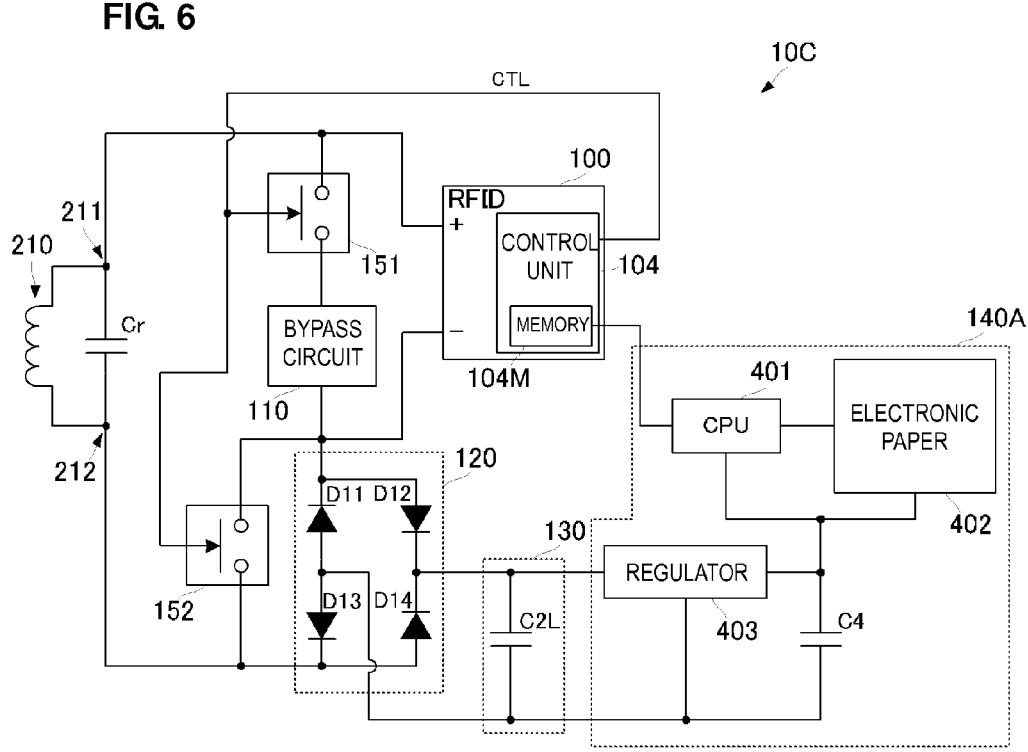
FIG. 6 is a functional circuit diagram when the electronic paper device 140A is used as the functional unit 140 according to the second preferred embodiment of the present invention.

Next, an electronic module with RFID according to a second preferred embodiment is described with reference to the drawings. FIG. 5 is a functional circuit diagram of an electronic module with RFID 10C according to the present preferred embodiment. FIG. 6 is a functional circuit diagram when the electronic paper device 140A is used as the functional unit 140 according to the present preferred embodiment.

The electronic module with RFID 10C according to the present preferred embodiment is obtained by adding a circuit configuration corresponding to the "current distribution ratio control unit" according to a preferred embodiment of the present invention to the electronic module with RFID 10A as illustrated in FIGS. 2A and 2B in the first preferred embodiment. Accordingly, in the following description, only portions relating to the "current distribution ratio control unit" are described, and description of other portions is omitted.

A first switching element 151 is connected in series to the bypass circuit 110, which is connected to the RFID 100 in parallel. Further, a second switching element 152 is connected in parallel between the first terminal 120A, and the second terminal 120B of the rectifying circuit 120.

A switch control signal CTL is applied to the first switching element 151 and the second switching element 152 from the control unit 104 of the RFID 100. In this case, the first switching element 151 and the second switching element 152 are controlled such that if one of the first switching element 151 and the second switching element 152 is opened, the other of them is short-circuited. For example, the first switching element 151 and the second switching element 152 are preferably defined by FET switches made of GaAs or the like. The first switching element 151 preferably is an enhancement type and the second switching element 152 preferably is a depression type, for example. A common switch control signal is applied to the first switching element 151 and the second switching element 152 from the control unit 104 of the RFID 100.

With this configuration, when the switch control signal is at "Low" level, the first switching element 151 is "opened" and the second switching element 152 is "short-circuited". On the other hand, when the switch control signal is at "Hi" level, the first switching element 151 is "short-circuited" and the second switching element 152 is "opened".

Figure 7A:
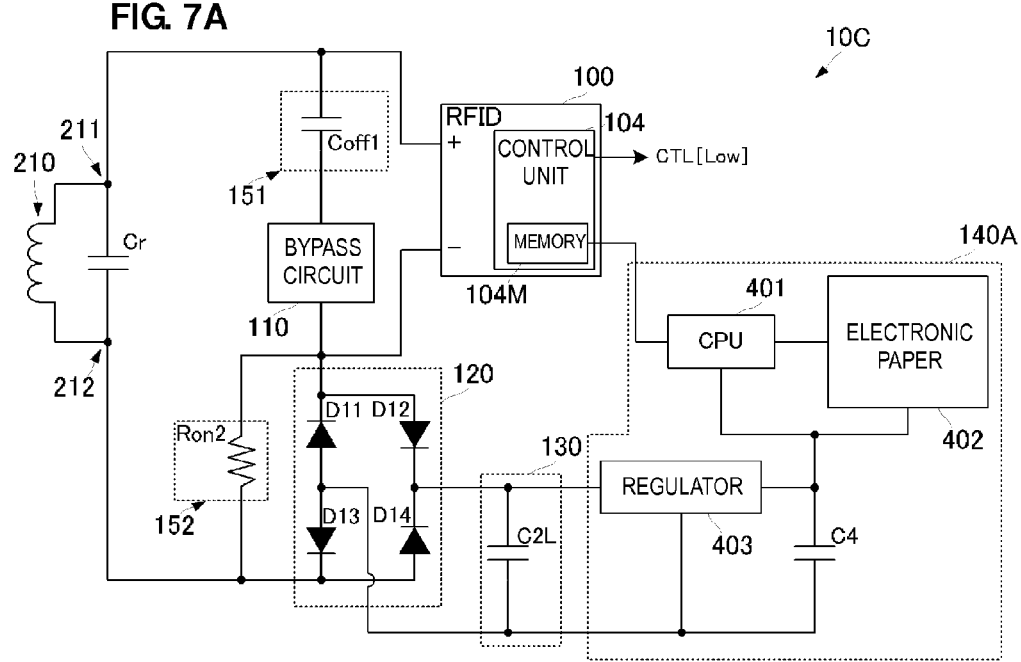
FIGS. 7A and 7B are diagrams of an equivalent circuit of the electronic module with RFID 10C when a switch control signal is at "Low" level and when the switch control signal is at "Hi" level.
Figure 7B:
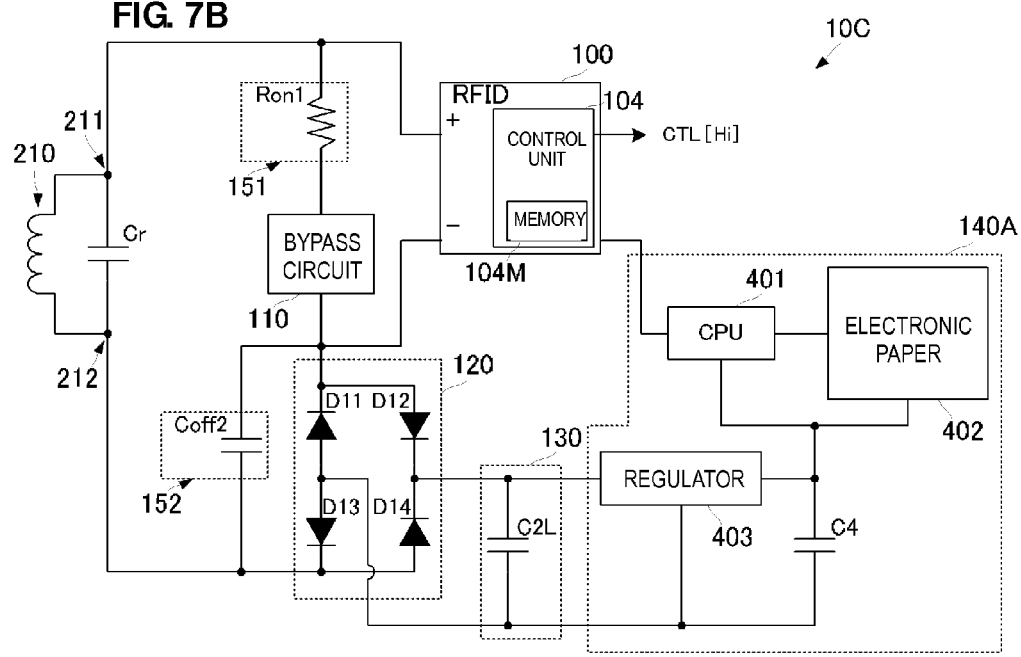

If this configuration is used and the switch control is performed as described above, a circuit configuration of the electronic module with RFID 10C according to the present preferred embodiment as illustrated in FIG. 6 changes to circuit configurations as illustrated in FIGS. 7A and 7B. FIG. 7A illustrates an equivalent circuit when the switch control signal is at "Low" level, and FIG. 7B illustrates an equivalent circuit when the switch control signal is at "Hi" level.

At first, in a state where power is not supplied to the electronic module with RFID 10C, the RFID 100 does not operate. Therefore, the state is the same as a state where the switch control signal CTL is at "Low" level. That is to say, as illustrated in FIG. 7A, the first switching element 151 is in an "opened" state with a predetermined capacitance Coff1, and the second switching element 152 is in a "short-circuited" state with a predetermined resistance value Ron2. Accordingly, in this state, a state where only the RFID 100 is connected between both of the terminals 211, 212 of the secondary-side antenna coil 210 is obtained.

If current flows through the secondary-side antenna coil 210 in this state, current flows through the RFID 100, but hardly flows through the rectifying circuit 120. Accordingly, almost all the power which is supplied from the reader/writer device 30 through the secondary-side antenna coil 210 is used to activate the RFID 100. This makes it possible to activate the RFID 100 reliably and stably even with a configuration in which only minimum necessary power is supplied to the RFID 100 in a state where the rectifying circuit 120 is connected in series, for example.

Then, when the functional unit is to be driven after the RFID 100 has been activated, the RFID 100 switches the switch control signal CTL to "Hi" level. A state of the electronic module with RFID 10C shifts to the circuit configuration as illustrated in FIG. 7B from the circuit configuration as illustrated in FIG. 7A. That is to say, the first switching element 151 is in the "short-circuited" state with a predetermined resistance value Ron1, and the second switching element 152 is in the "opened" state with a predetermined capacitance Coff2. Accordingly, in this state, a state where a parallel circuit of the RFID 100 and the bypass circuit 110, and the rectifying circuit 120 are connected in series between both of the terminals 211, 212 of the secondary-side antenna coil 210 is realized.

If the state of the electronic module with RFID 10C shifts to the circuit configuration as described above, current flows through not only the RFID 100 but also the rectifying circuit 120. Therefore, power for operation can be supplied to the RFID 100 and the electronic paper device 140A as the functional unit 140.

As described above, if the configuration according to the present preferred embodiment is used, power can be supplied to the RFID 100 only or to both of the RFID 100 and the functional unit 140 depending on conditions. Further, when the electronic module with RFID 10C is distanced from the reader/writer device 30, only the RFID 100 is operated so that power at the time of the activation of the RFID 100 is ensured reliably so as to activate the RFID 100 stably. Further, after the RFID 100 has been activated, power can be supplied to the functional unit 140 stably and reliably.

Figure 8:
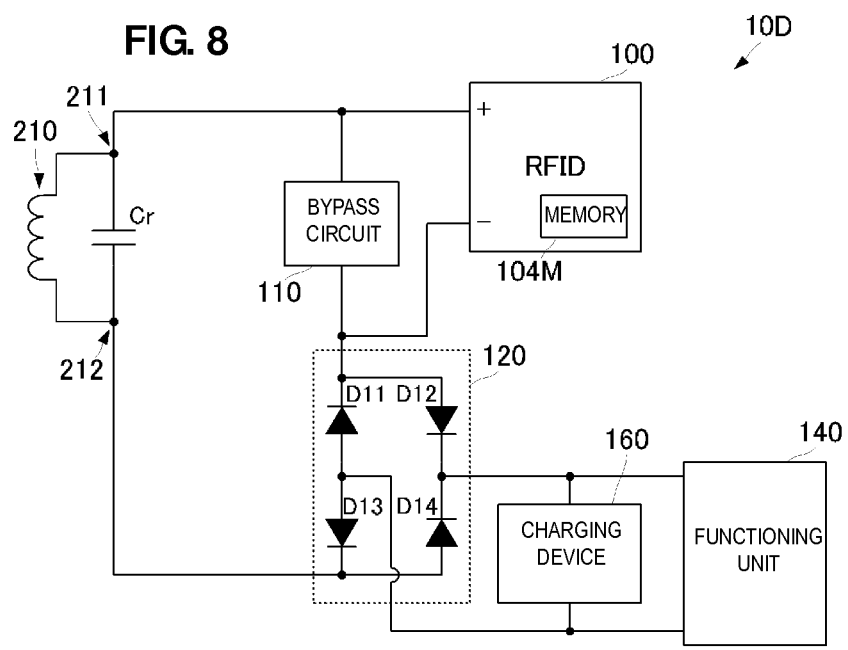
FIG. 8 is a configuration circuit diagram of an electronic module with RFID 10D according to a third preferred embodiment of the present invention.

Next, an electronic module with RFID according to a third preferred embodiment is described with reference to the drawing. FIG. 8 is a configuration circuit diagram of an electronic module with RFID 10D according to the present preferred embodiment.

The electronic module with RFID 10D according to the present preferred embodiment is obtained by connecting a charging device 160 to the electronic module with RFID 10A as illustrated in FIGS. 2A and 2B in the first preferred embodiment at a subsequent stage of the rectifying circuit 120. Further, the functional unit 140 is connected at a subsequent stage of the charging device 160.

The charging device 160 preferably includes an electric double layer capacitor or the like, for example, and is charged with signals on which full-wave rectification has been performed by the rectifying circuit 120. The functional unit 140 is operated by the charging device 160 serving as a power source. If the charging device 160 preferably includes the electric double layer capacitor, the charging device 160 can be reduced in thickness so that the electronic module with RFID 10D can be formed to be thin. In particular, when the electronic module with RFID 10D preferably includes using a certain plate-shaped base material, circuit elements other than the electric double layer capacitor are mounted on one main surface of the plate-shaped base material, and the electric double layer capacitor is formed on the substantially entire surface of the other main surface of the plate-shaped base material, which is opposed to the one main surface. This makes it possible to make the area of the base material smaller in comparison with a case in which the circuit elements configuring the electronic module with RFID 10D are mounted only on one main surface. As a result, the electronic module with RFID 10D can be formed to be reduced in size and thickness while ensuring a sufficient charging ability to supply power to the functional unit 140. All the constituent parts including the electric double layer capacitor can be mounted on the same main surface so as to configure an extremely thin electronic module.

Figure 9:
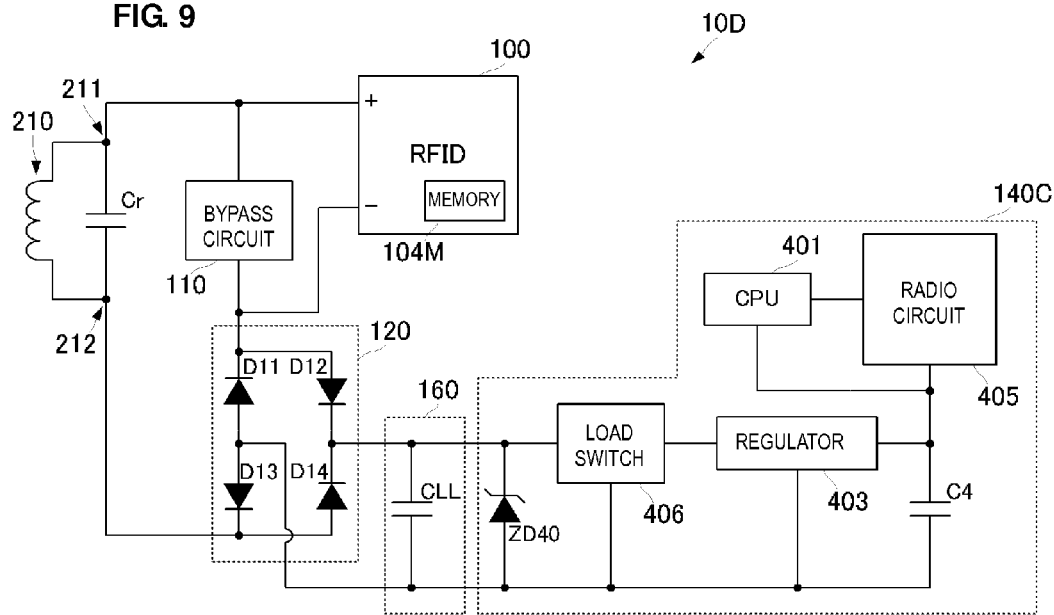
FIG. 9 is a functional circuit diagram of the electronic module with RFID 10D including a wireless communication device 140C according to the third preferred embodiment of the present invention.

Next, a specific example of the electronic module with RFID 10D including the charging device 160 as described in the present preferred embodiment is described with reference to FIG. 9. In the present example, an example in which a wireless communication device 140C which can perform long-distance communication in comparison with communication with an RFID is used as the functional unit 140 is described. FIG. 9 is a functional circuit diagram of the electronic module with RFID 10D when the wireless communication device 140C is used as the functional unit 140. FIG. 9 is a functional circuit diagram of the electronic module with RFID 10D including the wireless communication device 140C. It is to be noted that also in FIG. 9, since a specific configuration of the RFID 100 and connecting configurations of the antenna coil 210, the resonance capacitor Cr, the RFID 100, the bypass circuit 110, the rectifying circuit 120, and the charging device 160 are those as illustrated in FIGS. 2A and 2B and FIG. 8, description thereof is omitted.

The wireless communication device 140C as the functional unit 140 preferably includes the CPU 401, a radio circuit 405, the regulator 403, a load switch 406, and a zener diode ZD40.

An input-side terminal of the load switch 406 is connected to one terminal of the charging device 160, and a common terminal of the load switch 406 is connected to the other terminal of the charging device 160. A zener diode ZD40 is connected between the input-side terminal and the common terminal of the load switch 406. In this case, the zener diode ZD40 is connected such that a cathode thereof corresponds to the input-side terminal side of the load switch 406 and an anode thereof corresponds to the common terminal side of the load switch 406. The zener diode ZD40 restricts an upper limit voltage of the electric double layer capacitor so as to protect it from breakage.

An output-side terminal of the load switch 406 is connected to an input-side terminal of the regulator 403. Further, the common terminal of the load switch 406 and a common terminal of the regulator 403 are conducted with each other.

The smoothing capacitor C4 is connected between an output-side terminal and the common terminal of the regulator 403, and the output-side terminal of the regulator 403 is connected to the CPU 401 and the radio circuit 405. It is to be noted that common terminals of the CPU 401 and the radio circuit are not illustrated.

A regulator of which lower limit of an input voltage is low is used as the regulator and the load switch is made to have hysteresis. This makes it possible to supply a low-voltage power source without receiving an influence of voltage drop due to discharge of the electric double layer capacitor.

With this configuration, a voltage with a stable level can be supplied to the CPU 401 and the radio circuit 405 without being influenced by a charge state of the charging device 160.

The CPU 401 is operated with power that is supplied from the charging device 160, the load switch 406 and the regulator 403 so as to execute wireless communication control on the radio circuit 405. The radio circuit 405 is operated with power that is supplied from the charging device 160, the load switch 406 and the regulator 403 in the same manner as the CPU 401 so as to execute wireless communication with external communication equipment based on the wireless communication control from the CPU 401.

As a specific example of such wireless communication, the wireless communication can be used for a system in which presence/absence or the like of the electronic module with RFID 10D is checked by intermittently communicating with an external communication device. For example, a predetermined key is stored in the CPU 401 of the wireless communication device 140C and wireless communication with the external device is performed through the radio circuit 405 every predetermined timing so as to perform authentication processing of the key. When the electronic module with RFID 10D is spaced from the external device by a distance that is equal to or longer than some degree of distance, for example, being not present in a determined room or the like, and key authentication cannot be performed in a wireless manner, a function of the external device is stopped on the side of the external device.

Further, even when the function of performing wireless communication is added, if the configuration according to the present preferred embodiment is used, the electronic module with RFID 10D which can supply sufficiently necessary power to a wireless communication device which requires a power consumption amount larger than that for RFID communication, and which is reduced in size and thickness can be formed.

Figure 10:
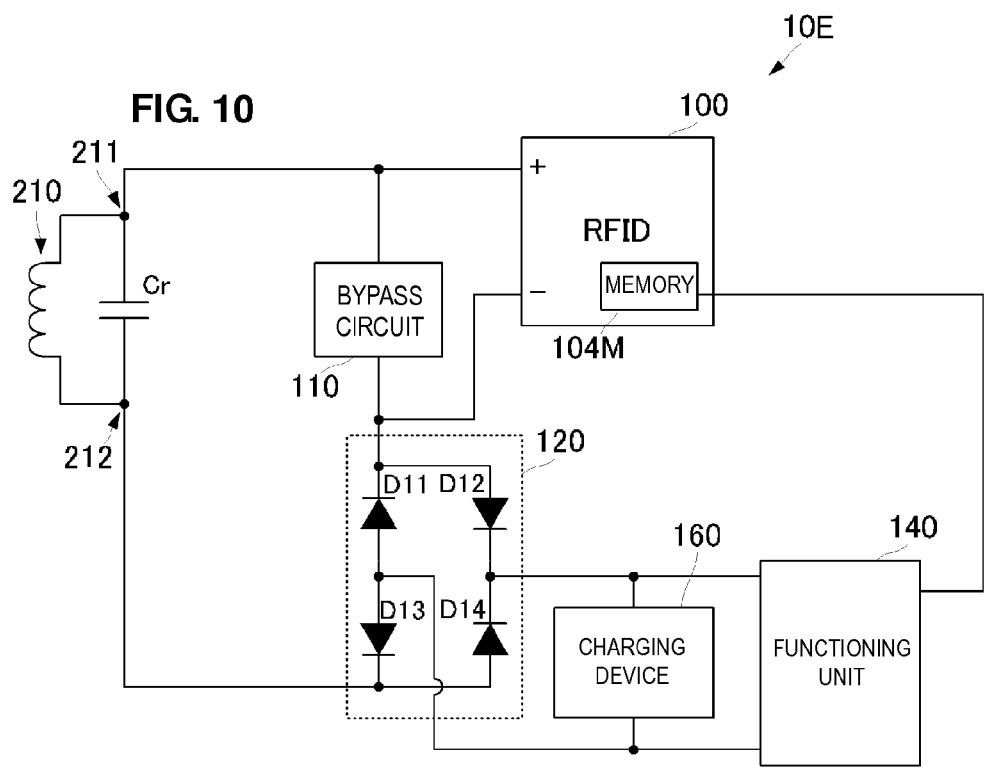
FIG. 10 is a configuration circuit diagram of an electronic module with RFID 10E according to a fourth preferred embodiment of the present invention.

Next, an electronic module with RFID according to a fourth preferred embodiment is described with reference to the drawings. FIG. 10 is a configuration circuit diagram of an electronic module with RFID 10E according to the present preferred embodiment.

The electronic module with RFID 10E according to the present preferred embodiment is obtained by making the functional unit 140 capable of accessing the memory 104M of the RFID 100 in the electronic module with RFID 10D as illustrated in FIG. 8 in the third preferred embodiment.

With this configuration, if a charge-state detecting circuit is provided on the functional unit 140, a charge state detected by the functional unit 140 can be stored in the memory 104M of the RFID 100. Further, the RFID 100 reads out the charge state in the memory 104M and transmits the read charge state to the reader/writer device 30 so that the reader/writer device 30 can monitor the charge state of the charging device 160 of the electronic module with RFID 10E.

Figure 11:
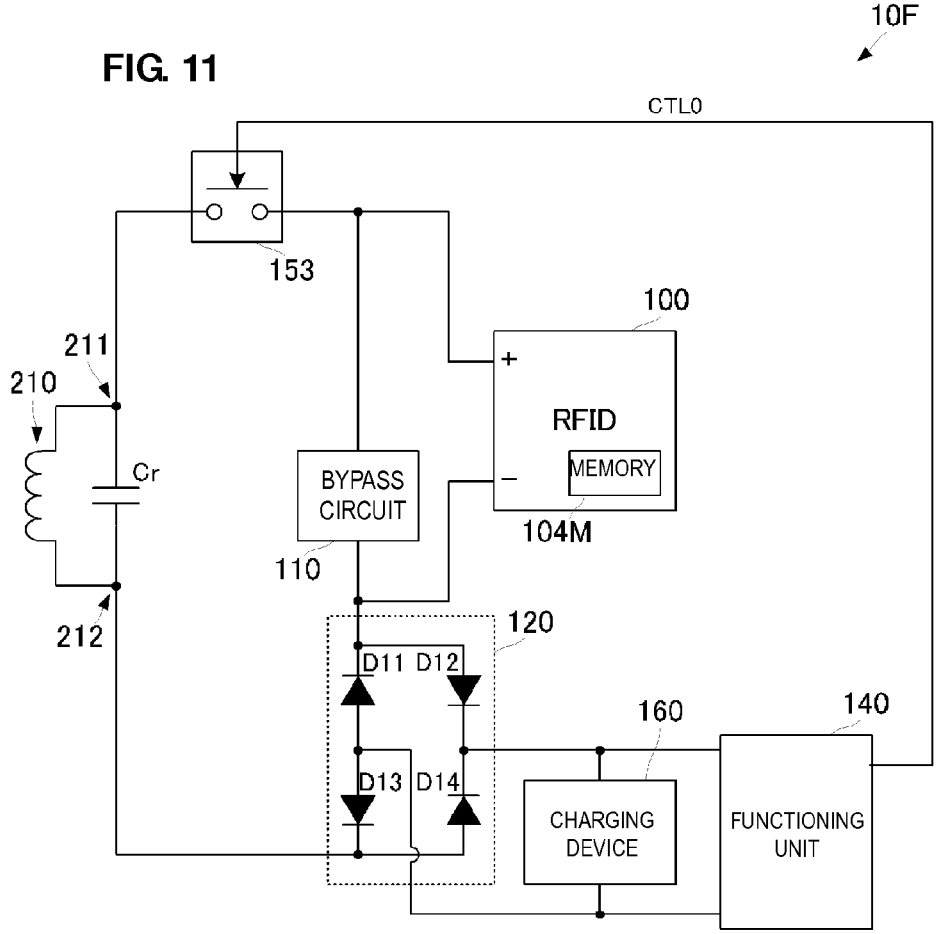
FIG. 11 is a configuration circuit diagram of an electronic module with RFID 10F according to a fifth preferred embodiment of the present invention.

Next, an electronic module with RFID according to a fifth preferred embodiment is described with reference to the drawings. FIG. 11 is a configuration circuit diagram of an electronic module with RFID 10F according to the present preferred embodiment.

The electronic module with RFID 10F according to the present preferred embodiment further includes a "power supply control unit for charging" added to the electronic module with RFID 10D including the charging device 160 as illustrated in FIG. 8 in the third preferred embodiment.

To be more specific, a charging detecting circuit that detects a charge state of the charging device 160 is provided on the functional unit 140 so that the functional unit 140 is made to have a function as a charge control unit. Further, the electronic module with RFID 10F further includes a charge control switching element 153.

The charge control switching element 153 is inserted between the one terminal 211 of the secondary-side antenna coil 210 and the parallel circuit of the RFID 100 and the bypass circuit 110. A switch control signal CTL0 is applied to the charge control switching element 153 from the functional unit 140. The charge control switching element 153 is a depression-type switching element. Therefore, when the switch control signal CTL0 is at "Low" level, the charge control switching element 153 is "short-circuited" so as to make the secondary-side antenna coil 210 be conducted with the RFID 100 and the bypass circuit 110. On the other hand, when the switch control signal CTL0 is at "Hi" level, the charge control switching element 153 is "opened".

First, if the charging device is not charged with a defined voltage, the functional unit 140 does not operate, and the state is the same as a state where the switch control signal CTL0 is at "Low" level. Therefore, the charge control switching element 153 is "short-circuited" and a closed circuit including the secondary-side antenna coil 210, the parallel circuit of the RFID 100 and the bypass circuit 110, and the rectifying circuit 120 is formed.

Then, if power is supplied from the reader/writer device 30 through the secondary-side antenna coil 210, the charging device 160 is charged through the rectifying circuit 120 of the closed circuit. In this case, the switch control signal CTL0 is kept at "Low" level and the charge control switching element 153 is kept "short-circuited" while the charging device 160 has not been charged to an amount of power which is necessary for operating the functional unit 140. In this case, since power is supplied to the RFID 100, the RFID 100 can execute communication of ID authentication or the like with the reader/writer device 30 by using the supplied power. This authentication makes it possible to identify whether or not the electronic module with RFID 10F has been permitted to be used, for example.

Then, if the charge of the charging device 160 proceeds and the functional unit 140 operates, a charge detecting circuit in the functional unit 140 detects a charge state of the charging device 160. If a charge amount detected by the charge detecting circuit is less than a predetermined threshold value, the functional unit 140 continues to output the switch control signal CTL0 at "Low" level. In this case, the charge control switching element 153 is kept "short-circuited" and the charge of the charging device 160 is continued.

Then, if the charge of the charging device 160 further proceeds and the charge amount detected by the charge detecting circuit becomes equal to or larger than the predetermined threshold value, the functional unit 140 outputs the switch control signal CTL0 at "Hi" level. The state of the charge control switching element 153 shifts from the "short-circuited" state to the "opened" state. With this, the RFID 100 and the functional unit 140 are electrically separated from the secondary-side antenna coil 210. In this case, operation of the RFID 100 stops, but the functional unit 140 can be operated by the charging device 160 serving as a power source. In addition, if the RFID 100 is stopped in this manner, unnecessary power can be suppressed from being supplied (consumed).

Further, with this configuration, the RFID 100 is stopped, and the RFID 100 and the charging device 160 are not connected to each other. Therefore, it is sufficient that the charging device 160 supplies power to the functional unit 140 only. Accordingly, the charging device 160 need not supply unnecessary power to the RFID 100 and can supply power only to the functional unit 140 effectively.

It is to be noted that if the functional unit 140 continuously operates, the charging device 160 naturally discharges or the like, the charge amount of the charging device 160 is lowered. In this case, the functional unit 140 detects that the charge amount is less than the predetermined threshold value and outputs the switch control signal CTL0 at "Low" level. With this, the secondary-side antenna coil 210, the RFID 100 and the rectifying circuit 120 are conducted with each other. Accordingly, if the electronic module with RFID 10F is arranged such that the primary-side antenna coil 310 of the reader/writer device 30 and the secondary-side antenna coil 210 are electromagnetically coupled to each other, the charging device 160 can be charged again.

Further, if the charge amount of the charging device 160 is largely lowered due to natural discharging, long time use of the functional unit 140 or the like, and consequently the functional unit 140 does not operate, the charge control switching element 153 is put into a state which is the same as a state where the switch control signal CTL0 at "Low" level is input. Accordingly, also in this case, if the electronic module with RFID 10F is arranged such that the primary-side antenna coil 310 of the reader/writer device 30 and the secondary-side antenna coil 210 are electromagnetically coupled to each other, the charging device 160 can be charged again.

Further, a case in which the charge state is judged by setting the threshold value of the charge amount has been described above. However, the switch control signal CTL0 at "Hi" level may be output in a case of full charge state, that is, when the charging device has been charged to a substantially maximum charge amount. Alternatively, completion of the charging may be detected when operation of the functional unit 140 starts or necessity of the charging may be judged when the operation of the functional unit 140 stops. In this case, a detection circuit is not required to be provided additionally. The switch control signal CTL0 during the operation is kept at "Hi" level. After the operation stops, the switch control signal CTL0 is set to "Low" level automatically.

Figure 12:
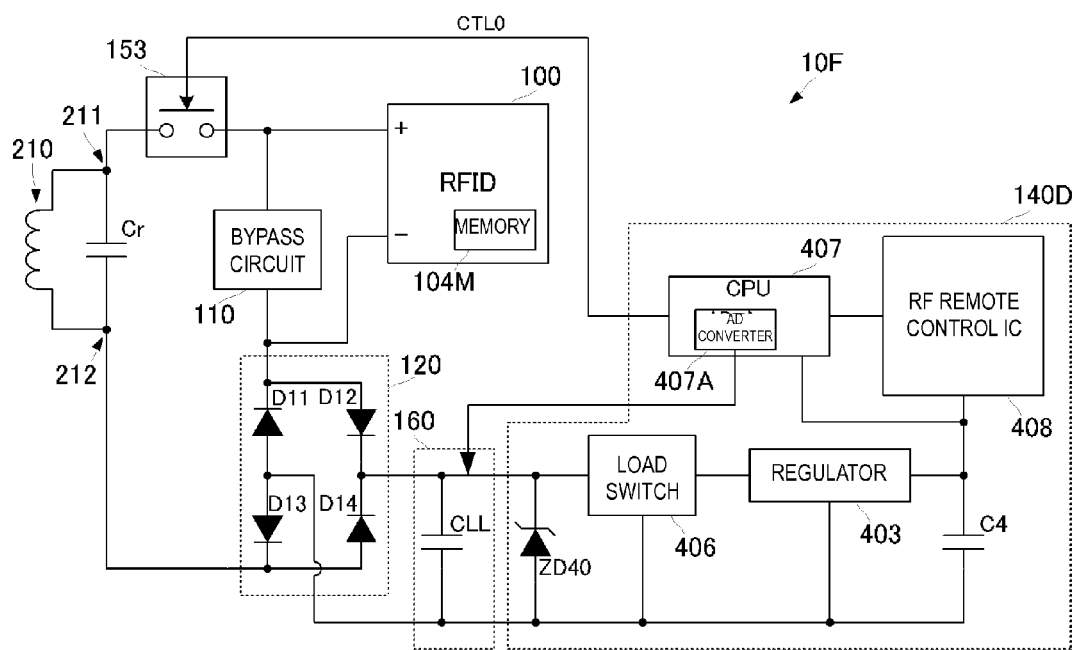
FIG. 12 is a functional circuit diagram of the electronic module with RFID 10F when a remote control device 140D is used as the functional unit 140 according to the fifth preferred embodiment of the present invention.

Next, a specific example of the electronic module with RFID 10F as described in the present preferred embodiment is described with reference to FIG. 12. In the present example, an example in which a remote control device 140D is used as the functional unit 140 is described. FIG. 12 is a functional circuit diagram of the electronic module with RFID 10F when the remote control device 140D is used as the functional unit 140. It is to be noted that also in FIG. 12, since a specific configuration of the RFID 100 and connecting configurations of the antenna coil 210, the resonance capacitor Cr, the RFID 100, the bypass circuit 110, the rectifying circuit 120, and the charging device 160 are those as illustrated in FIGS. 2A and 2B and FIG. 8, description thereof is omitted.

The remote control device 140D as the functional unit 140 includes the regulator 403, the load switch 406, the zener diode ZD40, and the smoothing capacitor C4 in the same manner as the above-described wireless device. Further, the remote control device 140D includes a CPU 407 and an RF remote control IC 408. Power is supplied to the CPU 407 and the RF remote control IC 408 with a circuit including the charging device 160, the zener diode ZD40 for protection, the load switch 406, the regulator 403, and the smoothing capacitor C4.

The CPU 407 performs the entire control of the remote control device 140D, detects a charge state of the charging device 160 through voltage detection with an AD converter 407A incorporated in the CPU 407, and outputs a switch control signal CTL0. To be more specific, if a charge amount is less than a predetermined threshold value, the CPU 407 outputs the switch control signal CTL0 at "Low" level to the charge control switching element 153. If the charge amount is equal to or larger than the predetermined threshold value, the CPU 407 outputs the switch control signal CTL0 at "Hi" level to the charge control switching element 153.

The RF remote control IC 408 transmits a remote control signal based on operation input from an operating button or the like (not illustrated).

To be more specific, the electronic module with RFID 10F having such a remote control function is used in the following manner, for example. It is to be noted that a case in which the electronic module with RFID 10F is used for remote control of a television device is described as an example, hereinafter. Further, the electronic module with RFID 10F having a remote control function is referred to as a TV remote control terminal, hereinafter.

The reader/writer device 30 is equipped on a television device as a base unit. When the TV remote control terminal is to be charged, the TV remote control terminal is placed on the reader/writer device 30. When the reader/writer device 30 has not authenticated the RFID 100 of the TV remote control terminal, the reader/writer device 30 generates a driving signal intermittently.

At first, in an initial state or the like where the charging device 160 is not charged, when the TV remote control terminal is not being placed on the reader/writer device 30, power is not supplied to the remote control device 140D as the functional unit 140. Accordingly, the initial state is the same as a state where the switch control signal CTL0 is at "Low" level. Therefore, the charge control switching element 153 is "short-circuited" and a closed circuit including the secondary-side antenna coil 210, the parallel circuit of the RFID 100 and the bypass circuit 110, and the rectifying circuit 120 is formed.

Then, if the TV remote control terminal is placed on the reader/writer device 30, power is supplied to the TV remote control terminal from the reader/writer device 30 through the secondary-side antenna coil 210. With this, current flows through the RFID 100 and the rectifying circuit 120, the RFID 100 is activated, and the charging device 160 is charged.

The RFID 100 performs data communication processing such as ID authentication with the television device through the reader/writer device 30 with the supplied power. This communication processing is continuously executed every predetermined timing. In this case, this remote control communication system may have a function of transmitting various types of information to the RFID 100 (TV remote control terminal) from the television device if the ID authentication is successfully carried out.

Meanwhile, the charging device 160 is sequentially charged. However, if the charging device 160 has not been charged to an amount of power which is necessary for operating the CPU 407, the switch control signal CTL0 is kept at "Low" level and the charge control switching element 153 is kept "short-circuited". Accordingly, the charging device 160 is continuously charged.

Then, if the charge of the charging device 160 proceeds and the CPU 407 operates, the charge detecting circuit of the CPU 407 detects a charge state of the charging device 160. If a charge amount detected by the charge detecting circuit is less than a predetermined threshold value, the CPU 407 continues to output the switch control signal CTL0 at "Low" level. In this case, the charge control switching element 153 is kept "short-circuited" and the charging device 160 is continued to be charged. It is to be noted that since the RF remote control IC 408 can operate at this time, a remote control operation can be performed by operation input with an operating button.

Then, if the charge of the charging device 160 further proceeds and the charge amount detected by the charge detecting circuit becomes equal to or larger than the predetermined threshold value in a substantially full charge state, the CPU 407 outputs the switch control signal CTL0 at "Hi" level. The state of the charge control switching element 153 shifts from the "short-circuited" state to the "opened" state. With this, the RFID 100 and the functional unit 140 are electrically separated from the secondary-side antenna coil 210. In this case, operation of the RFID 100 stops, but the remote control device 140D as the functional unit 140 can be operated by the charging device 160 serving as a power source. Accordingly, a user can detach the TV remote control terminal from the reader/writer device 30 so as to perform a normal remote control operation.

In this case, if the user detaches the TV remote control terminal from the reader/writer device 30, communication with the RFID 100 is disconnected. The reader/writer device 30 detects the communication disconnection so as to shift to a stand-by state, that is, an operation of intermittently generating a driving signal. This makes it possible to reduce power consumption of the reader/writer device 30.

Further, even when the user does not detach the TV remote control terminal from the reader/writer device 30, if the charge control switching element 153 is "opened", communication between the television device including the reader/writer device 30 and the RFID 100 is disconnected. The reader/writer device 30 detects the communication disconnection so as to shift to a stand-by state, that is, an operation of intermittently generating a driving signal. This makes it possible to reduce power consumption of the reader/writer device 30.

As described above, if the configuration according to the preferred embodiment is used, even if a remote control device is added to the electronic medium with RFID 10F, the remote control device of which power consumption is larger than that of the RFID 100 can be charged without passing through the RFID 100 so as to be operated stably. In this case, a circuit relating to the charge needs only a rectifying circuit including four diodes and a charging device such as an electric double layer capacitor as described above, thereby reducing the TV remote control terminal in size and thickness. Further, supply of power stops when the charging has been completed, so that power consumption can be reduced.

Figure 13:
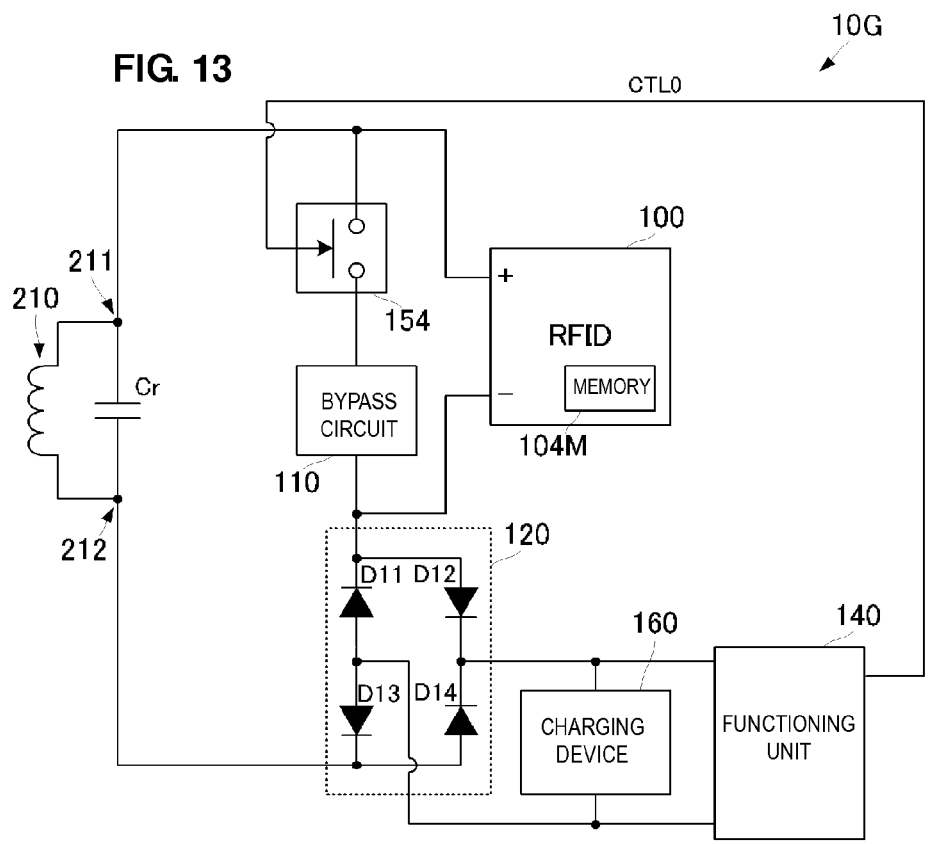
FIG. 13 is a configuration circuit diagram of an electronic module with RFID 10G according to a sixth preferred embodiment of the present invention.

Next, an electronic module with RFID according to a sixth preferred embodiment is described with reference to the drawings. FIG. 13 is a configuration circuit diagram of an electronic module with RFID 10G according to the present preferred embodiment.

The electronic module with RFID 10G according to the present preferred embodiment is obtained by making an arrangement position and a characteristic of a charge control switching element 154 different from the electronic module with RFID 10F including the charging device 160 and the "power supply control unit for charging" as illustrated in FIG. 11 in the fifth preferred embodiment. Accordingly, only different points from the electronic module with RFID 10F in the fifth preferred embodiment are described.

In the electronic module with RFID 10G according to the present preferred embodiment, the charge control switching element 154 is connected to the bypass circuit 110 in series, and the series circuit is connected to the RFID 100 in parallel. A switch control signal CTL0 is applied to the charge control switching element 154 from the functional unit 140. The charge control switching element 154 preferably is a depression-type switching element. Therefore, when the switch control signal CTL0 is at "Low" level, the charge control switching element 154 is "short-circuited" and a parallel circuit of the bypass circuit 110 and the RFID 100 is formed. On the other hand, when the switch control signal CTL0 is at "Hi" level, the charge control switching element 154 is "opened" so that the bypass circuit 110 is separated from a closed circuit including the secondary-side antenna coil 210, the RFID 100, and the rectifying circuit 120.

It is to be noted that state shift processing of the switch control signal CTL0 is preferably the same as that in the fifth preferred embodiment. In a state where charging is insufficient, the switch control signal CTL0 is at "Low" level, and in a state where charging becomes sufficient, the switch control signal CTL0 becomes to be at "Hi" level.

If the above configuration is used and the above processing is performed, in the state where charging is insufficient, the bypass circuit 110 functions so as to make a power supply ratio of the rectifying circuit 120 to the RFID 100 higher. On the other hand, if charging is sufficient, the bypass circuit 110 does not function, and the power supply ratio to the rectifying circuit 120 becomes lower.

It is to be noted that in this case, if the RFID 100 measures a power supply amount that is supplied to itself and detects that the power supply amount to itself has become larger, the RFID 100 can also transmit an instruction to suppress radiation power to the reader/writer device 30. In addition, the RFID 100 can also transmit the data on power supply amount to the reader/writer device 30, and suppression control of the power supply amount can be performed at the reader/writer device 30 side.

Figure 14:
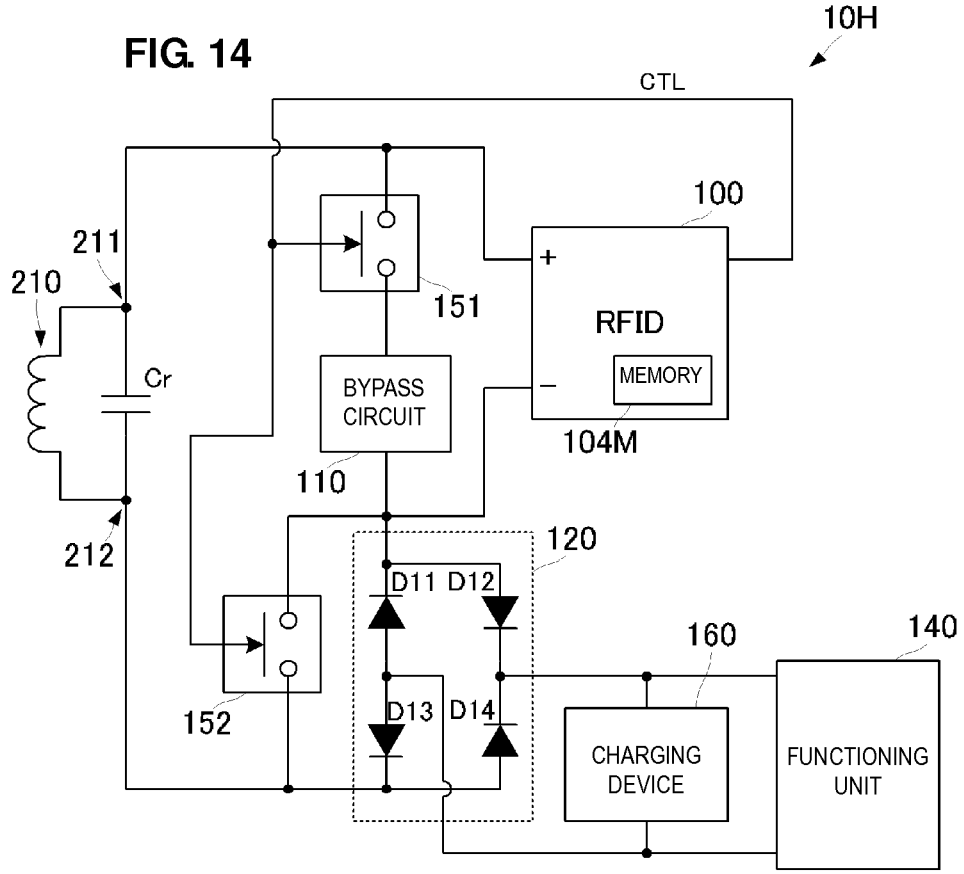
FIG. 14 is a configuration circuit diagram of an electronic module with RFID 10H according to a seventh preferred embodiment of the present invention.

Next, an electronic module with RFID according to a seventh preferred embodiment is described with reference to the drawings. FIG. 14 is a configuration circuit diagram of an electronic module with RFID 10H according to the present preferred embodiment.

The electronic module with RFID 10H according to the present preferred embodiment is obtained by including the charging device 160 in the electronic module with RFID 10C as illustrated in FIG. 5 in the second preferred embodiment. In this manner, the charging device 160 can be added to the configuration in the second preferred embodiment. With this, power is supplied only to the RFID 100 in an initial state, and the charging device 160 can be charged efficiently after communication processing such as ID authentication has been performed by the RFID 100.

Figure 15:
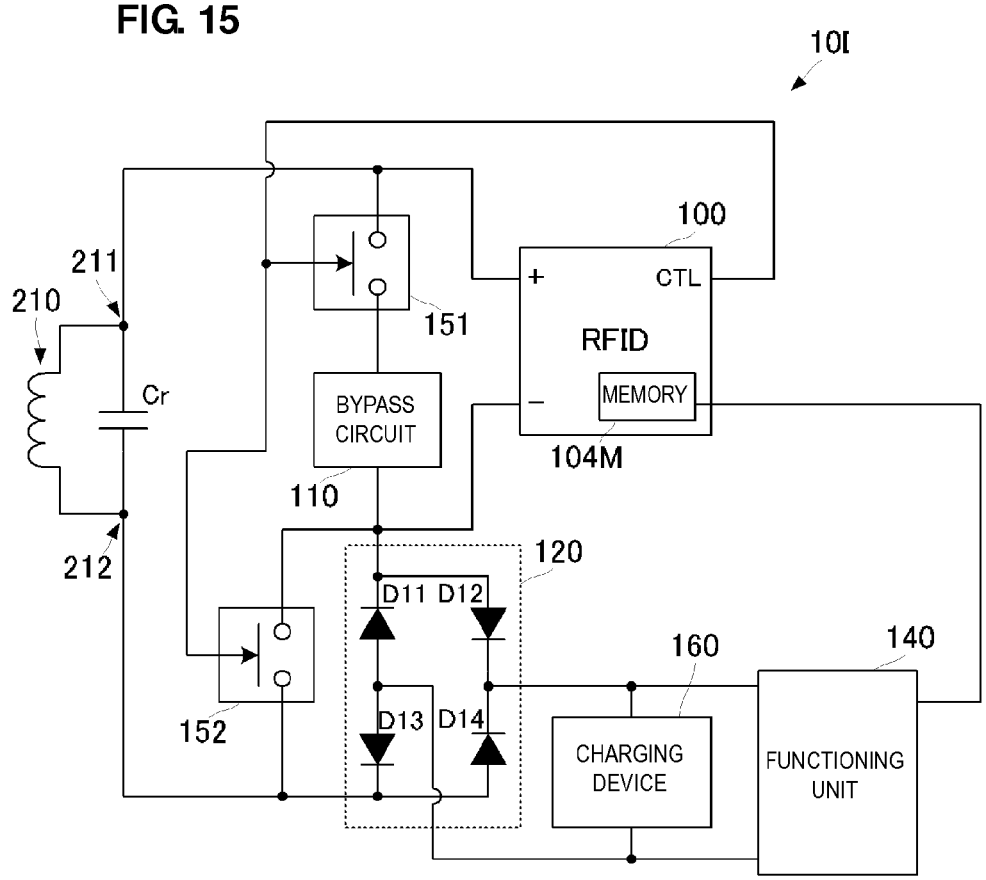
FIG. 15 is a configuration circuit diagram of an electronic module with RFID 10I according to an eighth preferred embodiment of the present invention.

Next, an electronic module with RFID according to an eighth preferred embodiment is described with reference to the drawings. FIG. 15 is a configuration circuit diagram of an electronic module with RFID 10I according to the present preferred embodiment.

The electronic module with RFID 10I according to the present preferred embodiment is different from the electronic module with RFID 10H as illustrated in FIG. 14 in the seventh preferred embodiment in a point that the functional unit 140 reads and writes from and into the memory 104M of the RFID 100. That is to say, the electronic module with RFID 10I according to the present preferred embodiment is different from the electronic module with RFID 10C as illustrated in FIG. 5 in the second preferred embodiment in points that the charging device 160 is included, and the functional unit 140 reads and writes from and into the memory 104M of the RFID 100, and is also different in a point of setting processing of a switch control signal CTL by the RFID 100. Accordingly, only the different points are described, hereinafter.

The charging device 160 preferably includes an electric double layer capacitor as in the above preferred embodiments and is arranged between the rectifying circuit 120 and the functional unit 140.

The functional unit 140 operates with the charging device 160 serving as a power source and writes charge information indicating a charge state of the charging device 160 into the memory 104M of the RFID 100.

The RFID 100 performs state shift processing as follows in addition to the state shift processing of the switch control signal CTL as illustrated in the second preferred embodiment, based on the charge information stored in the memory 104M.

To be more specific, after a switch control signal has shifted from "Low" state in the initial state to "Hi" state, that is, after the bypass circuit 110 starts functioning and current starts flowing through the rectifying circuit 120, the RFID 100 reads out charge information at a predetermined time interval. If the charge state is insufficient, the RFID 100 keeps the switch control signal CTL to be in "Hi" state.

Then, if charging proceeds so that the charge state becomes sufficient, the switch control signal CTL is made to shift to "Low" state. With this, the switching element 151 is "opened" and the switching element 152 is "short-circuited". Therefore, current does not flow through the rectifying circuit 120 and power is supplied to the RFID 100 only. That is to say, the electronic module with RFID 10I functions as a normal RFID device when seen from the side of the reader/writer device 30. If this configuration is used, unnecessary power is not supplied to the charging device 160 and the electronic module with RFID 10I can be made to function as a normal RFID device. Further, if the reader/writer device 30 has a function of varying radiation power, the reader/writer device 30 can detect that the electronic module with RFID 10I functions as the RFID device only so as to reduce the radiation power. This makes it possible to realize power saving of the reader/writer device 30.

It is to be noted that if the charging device 160 is discharged and a charge amount becomes insufficient, charge information stored in the memory 104M is updated in accordance with the discharge. Thus, the RFID 100 acquires the information and shifts the switch control signal CTL to "Hi" state, again. With this, current flows through the rectifying circuit 120, again, and the charging device 160 can be charged efficiently.

Further, in the above description, an example in which the charge information is written into the memory 104M of the RFID 100 from the functional unit 140 has been described. However, other information such as measured data acquired by the functional unit 140 may be written into the memory 104M.

Figure 16:
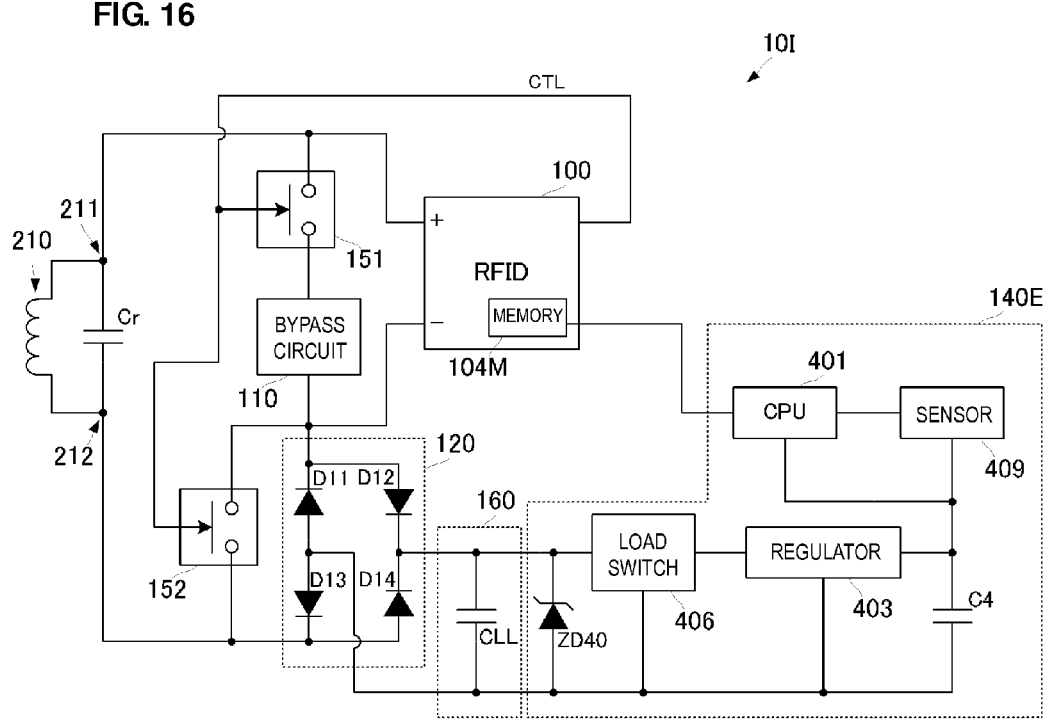
FIG. 16 is a functional circuit diagram of the electronic module with RFID 10I when the functional unit 140 is a sensor device 140E according to the eighth preferred embodiment of the present invention.

Then, a specific example when information other than the charge information which has been acquired by the functional unit 140 is written into the memory 104M is described. FIG. 16 is a functional circuit diagram of the electronic module with RFID 10I when the functional unit 140 is a sensor device 140E. It is to be noted that also in FIG. 16, since a specific configuration of the RFID 100 and connecting configurations of the secondary-side antenna coil 210, the resonance capacitor Cr, the RFID 100, the bypass circuit 110, the rectifying circuit 120, and the charging device 160 are the same as those in the above-described corresponding preferred embodiment, description thereof is omitted. Further, since configurations of the zener diode ZD40, the smoothing capacitor C4, the regulator 403, and the load switch 406 in the sensor device 140E are also the same as those in the above-described corresponding preferred embodiment, description thereof is omitted.

The sensor device 140E includes the CPU 401 and a sensor 409 in addition to a power source system circuit including the zener diode ZD40, the smoothing capacitor C4, the regulator 403, and the load switch 406.

The CPU 401 and the sensor 409 are operated with power obtained from the charging device 160 and the power source system circuit.

The CPU 401 controls the entire sensor device 140E and performs data communication with the RFID 100. Further, the CPU 401 writes measured data received from the sensor 409 into the memory 104M of the RFID 100.

The sensor 409 measures a predetermined physical quantity of a temperature sensor or the like, for example, and outputs the measured data to the CPU 401.

To be more specific, the electronic module with RFID 10I including such sensor device may preferably be used in the following manner, for example.

At first, the electronic module with RFID 10I is placed on the reader/writer device 30 or a power feeding device and the RFID 100 is operated so as to charge the charging device 160 while controlling the switching elements 151, 152, as described above.

The sensor 409 acquires measured data at a predetermined time interval so as to output the measured data to the CPU 401 while receiving power supply from the charging device 160. In this case, for example, the CPU 401 has a function of detecting an operating state of the RFID 100. If the electronic module with RFID 10I is separated from the reader/writer device 30 or the power feeding device, the RFID 100 stops. The CPU 401 detects the stop so as to control the sensor 409 to start measuring. The sensor 409 starts measuring in accordance with the measurement start control. With this, when the measurement is not necessary in a state where the electronic module with RFID 10I is placed on the reader/writer device 30 or the power feeding device, the charging device 160 can prevent wasteful discharging. This configuration is effective when the electronic module with RFID 10 is a cargo tag with a sensor and a temperature history or the like during transportation is needed to be acquired.

The CPU 401 sequentially stores in the memory 104M of the RFID 100 the measured data which has been sequentially acquired.

Further, when a measuring period has ended, for example, the electronic module with RFID 10I is placed on the reader/writer device 30 at a time point when the above-described temperature history during transportation need not be acquired. Note that before the placement, the RFID 100 does not operate and a configuration in which only the RFID 100 is connected to the secondary-side antenna coil 210 is adopted as a circuit. Accordingly, power is supplied only to the RFID 100 and only the RFID 100 is activated first immediately after the placement.

Measured data which has been continuously stored is stored in the memory 104M of the RFID 100. Therefore, the RFID 100 transmits the measured data to the reader/writer device 30. With this, the reader/writer device 30 can acquire the measured data (temperature history in the above-described case of cargo). Further, the RFID 100 sets the switch control signal CTL to be kept at "Low" level while the measured data is transmitted. If the switch control signal CTL is set in this manner, an amount of power to be supplied to the RFID 100 is kept large while the measured data is transmitted, thereby transmitting data at high speed.

If the RFID 100 has finished transmission of all the measured data, the RFID 100 sets the switch control signal CTL to "Hi" level. With this, current flows through the rectifying circuit 120 so as to charge the charging device 160 again. Further, in this case, the charging device 160 can be charged efficiently by passing through the bypass circuit 110.

That is to say, if the configuration of the present preferred embodiment is used and the processing of the present preferred embodiment is performed, efficient charge and high-speed communication between the RFID 100 and the reader/writer device 30 can be realized. Further, such a configuration which is simplified and reduced in size and thickness can be realized.

Figure 17:
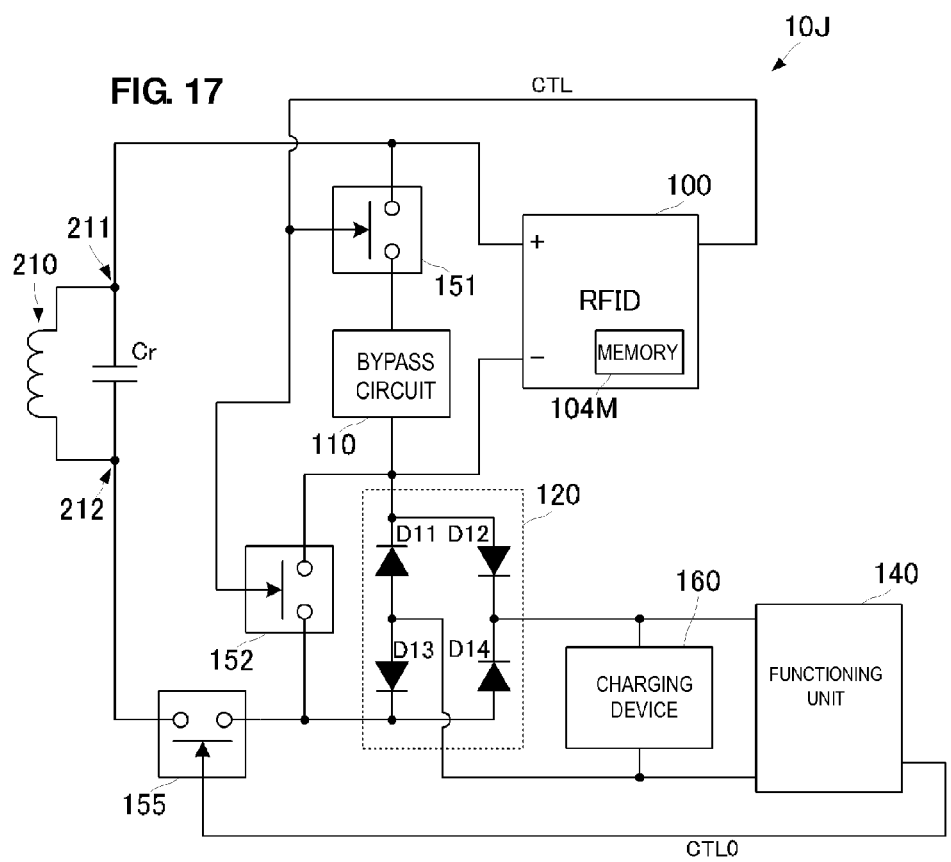
FIG. 17 is a configuration circuit diagram of an electronic module with RFID 10J according to a ninth preferred embodiment of the present invention.

Next, an electronic module with RFID according to a ninth preferred embodiment is described with reference to the drawings. FIG. 17 is a configuration circuit diagram of an electronic module with RFID 10J according to the present preferred embodiment.

The electronic module with RFID 10J according to the present preferred embodiment is different from the electronic module with RFID 10I as illustrated in FIG. 16 in the eighth preferred embodiment in points that a charge control switching element 155 is added and the switch control signal CTL0 is given to the charge control switching element 155 from the functional unit 140. It is to be noted that the functional unit 140 includes the charge detecting circuit which detects a charge state of the charging device 160 as described in the fifth preferred embodiment and the sixth preferred embodiment. Further, writing into the memory 104M of the RFID 100 from the functional unit 140 is not illustrated. Accordingly, different points only are described hereinafter.

Processing until the charging device 160 is charged from an uncharged state is the same as that in the eighth preferred embodiment. If the functional unit 140 detects that the charging device 160 is charged sufficiently, the functional unit 140 outputs the switch control signal CTL0 at "Hi" level.

The charge control switching element 155 preferably is a depression-type switching element. When the functional unit 140 does not operate, or the charging device 160 is not sufficiently charged and the charge control switching element 155 receives the switch control signal CTL0 at "Low" level, the charge control switching element 155 is "short-circuited". However, when the charging device 160 is charged sufficiently and the charge control switching element 155 receives the switch control signal CTL0 at "Hi" level, the charge control switching element 155 is "opened". With this, the RFID 100 and the rectifying circuit 120 are separated from the secondary-side antenna coil 210, and current is not supplied to the RFID 100 and the rectifying circuit 120. As a result, supply of unnecessary power can be stopped. Further, in this state, if the reader/writer device 30 detects communication disconnection with the RFID 100 and switches to intermittent transmission of the driving signal, it is possible to realize power saving of the reader/writer device 30.

Figure 18:
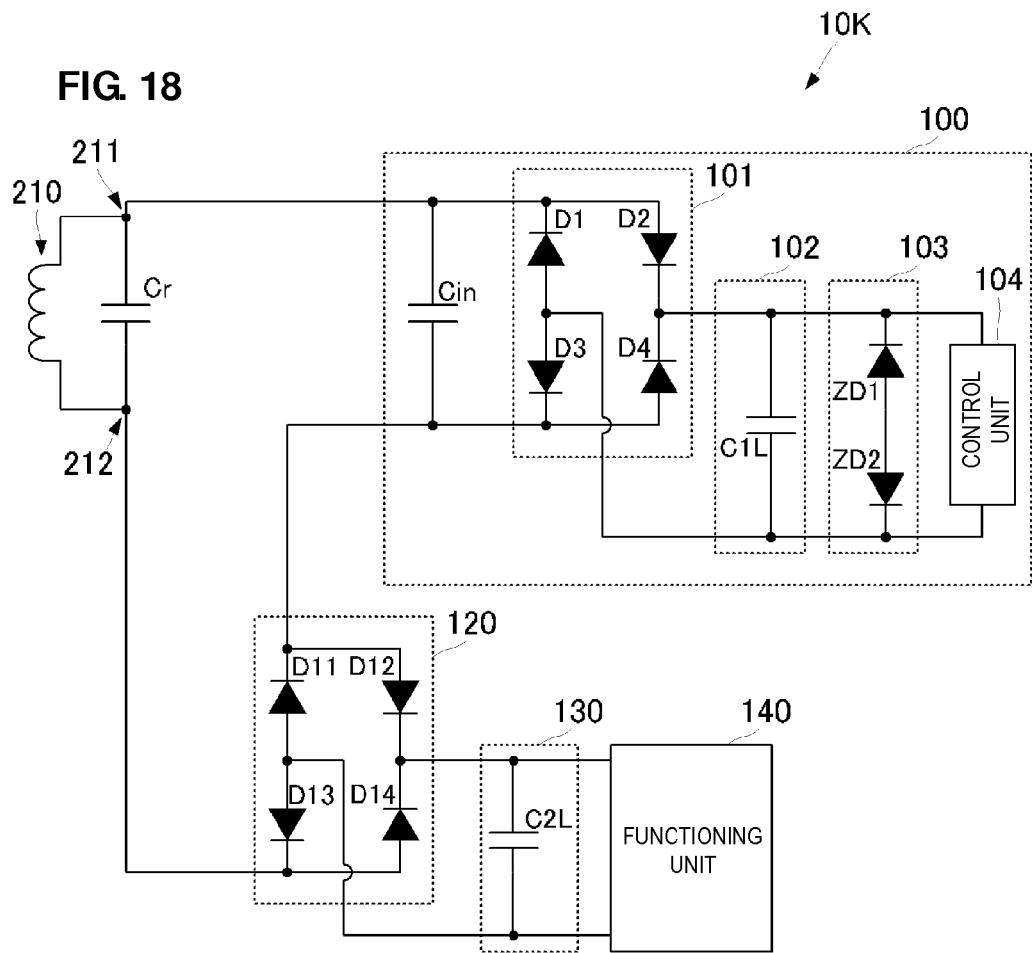
FIG. 18 is a configuration circuit diagram of an electronic module with RFID 10K according to a tenth preferred embodiment of the present invention.

Next, an electronic module with RFID according to a tenth preferred embodiment is described with reference to the drawings. FIG. 18 is a configuration circuit diagram of an electronic module with RFID 10K according to the present preferred embodiment.

In the above-described preferred embodiments, a case in which the bypass circuit 110 is included has been described. However, as described in the first preferred embodiment, the bypass circuit 110 can be eliminated. In the present preferred embodiment, a circuit configuration when the bypass circuit 110 is not used is described.

As illustrated in FIG. 18, the electronic module with RFID 10K according to the present preferred embodiment is obtained by eliminating the capacitor Cb from the electronic module with RFID 10A as illustrated in FIGS. 2A and 2B in the first preferred embodiment.

Even with this configuration, a current path is ensured by the input capacitor Cin of the RFID 100 and the smoothing capacitor C1L configuring the smoothing circuit 102. Further, even if the RFID 100 does not include the input capacitor Cin, a current path is ensured by the smoothing capacitor C1L. Accordingly, even if the rectifying circuit 101 of the RFID 100 and the rectifying circuit 120 are connected in series, current can be supplied to each of the rectifying circuit 101 and the rectifying circuit 120. With this, power can be supplied to the functional unit 140, which is separated from the RFID 100, without passing through the control unit 104 of the RFID 100. Further, if this configuration is used, constituent components can be further reduced so as to simplify the circuit.

Next, an electronic module with RFID according to an eleventh preferred embodiment is described with reference to the drawings. FIG. 19 is a configuration circuit diagram of an electronic module with RFID 10L according to the present preferred embodiment.

The electronic module with RFID 10L according to the present preferred embodiment is different from the electronic module with RFID 10K as illustrated in FIG. 18 in the tenth preferred embodiment in points that a charge control switching element 156 is included, and a switch control signal CTL0 is provided to the charge control switching element 156 from the functional unit 140. It is to be noted that the functional unit 140 includes the charge detecting circuit which detects a charge state of the charging device 160 as described in the fifth preferred embodiment and the sixth preferred embodiment. Accordingly, only different points are described hereinafter.

The charge control switching element 156 is an enhancement-type switching element and is connected to the rectifying circuit 120 in parallel. The charge control switching element 156 is "opened" and current flows through the rectifying circuit 120 until the charging device 160 has been charged from an uncharged state and the functional unit 140 outputs the switch control signal CTL0 at "Hi" level. With this, the charging device 160 is sequentially charged.

If the functional unit 140 detects that the charging device 160 is charged sufficiently, the functional unit 140 outputs the switch control signal CTL0 at "Hi" level. If the charge control switching element 156 receives the switch control signal CTL0 at "Hi" level, the charge control switching element 156 is "short-circuited" and current is not supplied to the rectifying circuit 120. With this, if the charging device 160 is charged sufficiently, the electronic module with RFID 10L functions as an RFID module simply. It is to be noted that in this case, charge information can be also given to the RFID 100 from the functional unit 140. If such configuration is used, the RFID 100 transmits the information indicating that the charging device 160 is charged sufficiently to the reader/writer device 30, and the reader/writer device 30 can reduce radiation power to a degree which is sufficiently necessary for operating the RFID 100.

It is to be noted that each of the above-described preferred embodiments is a representative example for realizing a characteristic configuration of the present invention, and configurations of the preferred embodiments may be appropriately combined as desired. Further, in the above description, as an example in which a charging device is used, electronic paper, a wireless communication device, a remote control device, and a sensor device are described. However, the configurations of the present invention can be also applied to various types of mobile electronic devices using a rechargeable battery.

Further, in the above description, a system which receives power supply with electromagnetic coupling of the antenna coils has been described as an example. However, the above-described configuration can be also applied to a system and an IC-mounted electronic device which receive power supply through a power feeding terminal pair with another method.

In addition, in the above description, an example in which a bypass circuit preferably includes a capacitor having a fixed capacitance value has been described. However, a variable capacitance element or other circuits which bypass an AC current by a constant ratio or a variable ratio may be used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An electronic medium with an integrated circuit comprising:
   a power feeding terminal pair including a first power feeding terminal and a second power feeding terminal;
   an integrated circuit including at least one first rectifying circuit;
   a second rectifying circuit that is separate from the integrated circuit;
   a charging device connected to an output terminal of the second rectifying circuit;
   a supply power control unit arranged and programmed to control an amount of power to be supplied to at least the second rectifying circuit; and
   a bypass circuit connected to the first rectifying circuit in parallel; wherein
   the supply power control unit includes:
      a charge control switching element connected to the first rectifying circuit and the second rectifying circuit in series; and
      a charge control unit arranged and programmed to detect a charge state of the charging device to control closing and opening of the charge control switching element;
   the first rectifying circuit and the second rectifying circuit are connected in series between the first power feeding terminal and the second power feeding terminal; and
   the electronic medium receives a supply of power in a non-contact manner.

2. The electronic medium with the integrated circuit according to claim 1, further comprising an antenna coil, both ends of which are connected to the power feeding terminal pair.

3. The electronic medium with the integrated circuit according to claim 1, wherein the integrated circuit is a radio frequency identification chip.

4. The electronic medium with the integrated circuit according to claim 1, further comprising a current distribution ratio control unit arranged and programmed to control a current distribution ratio with respect to the first rectifying circuit and the second rectifying circuit.

5. The electronic medium with the integrated circuit according to claim 4, wherein the current distribution ratio control unit includes:
    a first switch connected to the first rectifying circuit in parallel;
    a second switch connected to the second rectifying circuit in parallel; and
    a switch control unit arranged and programmed to perform control such that one of the first switch and the second switch is opened and the other of the first switch and the second switch is short-circuited.

6. The electronic medium with the integrated circuit according to claim 5, wherein
    the switch control unit is included in the integrated circuit;
    the switch control unit outputs a control voltage signal at Low level or High level;
    the first switch is opened with the control voltage signal at Low level and is short-circuited with the control voltage signal at High level; and
    the second switch is short-circuited with the control voltage signal at Low level and is opened with the control voltage signal at High level.

7. The electronic medium with the integrated circuit according to claim 5, wherein the first switch is connected to the bypass circuit in series.

8. The electronic medium with the integrated circuit according to claim 1, wherein
    the supply power control unit outputs a supply control voltage signal at Low level or High level; and
    the charge control switching element is short-circuited with the supply control voltage signal at Low level and is opened with the supply control voltage signal at High level.

9. The electronic medium with the integrated circuit according to claim 1, wherein the supply power control unit includes:
    another charge control switching element connected to the second rectifying circuit in parallel; and
    the charge control unit is arranged and programmed to detect a charge state of the charging device to control closing and opening of the another charge control switching element.

10. The electronic medium with the integrated circuit according to claim 1, wherein
    the integrated circuit includes a memory; and
    the electronic medium with the integrated circuit includes a charge state detecting unit arranged and programmed to detect a charge state of the charging device to write information of the charge state into the memory.

11. The electronic medium with the integrated circuit according to claim 1, wherein
    the integrated circuit includes a memory and the charge control unit;
    the electronic medium with the integrated circuit includes a charge state detecting unit arranged and programmed to detect a charge state of the charging device to write information of the charge state into the memory; and
    the charge control unit performs switch control based on the charge state stored in the memory.

12. The electronic medium with the integrated circuit according to claim 1, wherein a functional unit arranged to electrically realize a predetermined function is connected to an output terminal of the second rectifying circuit.

13. The electronic medium with the integrated circuit according to claim 12, wherein the functional unit is a display device including a display panel that displays information and a display control unit arranged and programmed to control display of the display panel.

14. A system of an electronic medium with an integrated circuit comprising:
    the electronic medium with the integrated circuit according to claim 1; and
    an external power feeding device arranged to provide an AC signal through the power feeding terminal pair.

15. The system of the electronic medium with the integrated circuit according to claim 14, wherein
    the electronic medium with the integrated circuit includes an antenna coil; and
    the external power feeding device is a reader/writer device including a different antenna coil that is arranged to be electromagnetically coupled to the antenna coil of the electronic medium with the integrated circuit, and a signal processing unit arranged to apply a signal having a predetermined frequency to the different antenna coil.

* * * * *